United States Patent
Horn et al.

(10) Patent No.: US 11,323,851 B2
(45) Date of Patent: *May 3, 2022

(54) MULTICASTING TRAFFIC USING MULTI-CONNECTIVITY

(71) Applicant: QUALCOMM Incorporated, San Diego, CA (US)

(72) Inventors: Gavin Bernard Horn, La Jolla, CA (US); Nathan Edward Tenny, Poway, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

This patent is subject to a terminal disclaimer.

(21) Appl. No.: 16/191,764

(22) Filed: Nov. 15, 2018

(65) Prior Publication Data
US 2019/0222966 A1 Jul. 18, 2019

Related U.S. Application Data

(63) Continuation of application No. 14/597,102, filed on Jan. 14, 2015, now Pat. No. 10,142,799.
(Continued)

(51) Int. Cl.
*H04W 4/06* (2009.01)
*H04W 80/02* (2009.01)
(Continued)

(52) U.S. Cl.
CPC .............. *H04W 4/06* (2013.01); *H04L 12/189* (2013.01); *H04L 45/245* (2013.01);
(Continued)

(58) Field of Classification Search
CPC ... H04W 4/06; H04W 28/0263; H04W 28/12; H04W 40/02; H04W 40/248;
(Continued)

(56) References Cited

U.S. PATENT DOCUMENTS 8,891,356 B2   11/2014   Zhang et al.
8,929,290 B2   1/2015    Lindner
(Continued)

FOREIGN PATENT DOCUMENTS

CN   101873631 A   10/2010
CN   102474752 A   5/2012
(Continued)

OTHER PUBLICATIONS

Fujitsu, "PDCP status report in dual Connectivity", 3GPP TSG-RAN WG2 Meeting #85b, 3GPP Draft; R2-141246, 3rd Generation Partnership Project (3GPP), Mobile Competence Centre ; 650, Route Des Lucioles ; F-06921 Sophia-Antipolis Cedex; France, vol. RAN WG2, No. Valencia, Spain; Mar. 31, 2014-Apr. 4, 2014 Mar. 20, 2014 (Mar. 20, 2014), XP050817319, 4 Pages. Retrieved from the Internet: URL: http://www.3gpp.org/ftp/tsg_ran/WG2_RL2/TSGR2_85bis/Docs/—[retrieved on Mar. 20, 2014].
(Continued)

*Primary Examiner* — Chi Tang P Cheng
(74) *Attorney, Agent, or Firm* — Qualcomm IP Dept.; James Hunt Yancey, Jr.

(57) ABSTRACT

Certain aspects of the present disclosure relate to methods and apparatus for multicasting traffic using multi-connectivity. A wireless network can send a downlink (DL) packet, which follows one path from a core network entity to a user equipment (UE) under current standards, to multiple base stations (BSs) and from each of the base stations to a UE. The UE receives the DL packet from whichever BS first delivers the DL packet, and then the UE sends a report reporting receipt of the DL packet back to all of the BSs. BSs that receive a report indicating the UE received the packet can drop the packet, even if they have not yet successfully delivered the packet. The same procedure can be used for an
(Continued)

UL packet, which can be sent from a UE to multiple BSs, and from the BSs to a core network entity.

28 Claims, 19 Drawing Sheets

Related U.S. Application Data

(60) Provisional application No. 62/039,227, filed on Aug. 19, 2014.

(51) Int. Cl.
| | |
|---|---|
| H04W 28/12 | (2009.01) |
| H04W 40/24 | (2009.01) |
| H04W 28/02 | (2009.01) |
| H04L 45/30 | (2022.01) |
| H04L 45/24 | (2022.01) |
| H04L 12/18 | (2006.01) |
| H04W 40/02 | (2009.01) |

(52) U.S. Cl.
CPC ....... *H04L 45/306* (2013.01); *H04W 28/0263* (2013.01); *H04W 28/12* (2013.01); *H04W 40/02* (2013.01); *H04W 40/248* (2013.01); *H04W 80/02* (2013.01)

(58) Field of Classification Search
CPC .... H04W 80/02; H04L 12/189; H04L 45/245; H04L 45/306
USPC ......................................................... 370/312
See application file for complete search history.

(56) References Cited

U.S. PATENT DOCUMENTS

| | | | |
|---|---|---|---|
| 10,142,799 B2 | 11/2018 | Horn et al. | |
| 2001/0012279 A1 | 8/2001 | Haumont et al. | |
| 2002/0046379 A1* | 4/2002 | Miki ..................... | H04L 1/1819 714/749 |
| 2005/0099983 A1 | 5/2005 | Nakamura et al. | |
| 2006/0083184 A1 | 4/2006 | Haumont et al. | |
| 2007/0248049 A1* | 10/2007 | Fajardo ................. | H04W 36/02 370/331 |
| 2008/0247349 A1* | 10/2008 | Hsieh ....................... | H04L 1/189 370/315 |
| 2011/0111693 A1* | 5/2011 | Nakao ................... | H04L 1/1887 455/9 |
| 2011/0122812 A1* | 5/2011 | Jeong ..................... | H04W 36/18 370/328 |
| 2012/0057560 A1 | 3/2012 | Park et al. | |
| 2012/0281564 A1 | 11/2012 | Zhang et al. | |
| 2013/0136102 A1* | 5/2013 | Macwan ............... | H04W 36/32 370/331 |
| 2013/0178219 A1 | 7/2013 | Lee et al. | |
| 2013/0201954 A1 | 8/2013 | Gao et al. | |
| 2013/0215822 A1* | 8/2013 | Worrall ................... | H04L 47/34 370/315 |
| 2014/0056243 A1* | 2/2014 | Pelletier ............ | H04W 72/1268 370/329 |
| 2014/0204871 A1 | 7/2014 | Ode | |
| 2014/0241317 A1 | 8/2014 | Jamadagni et al. | |
| 2014/0286305 A1 | 9/2014 | Yamada | |
| 2015/0036608 A1 | 2/2015 | Morita | |
| 2015/0382336 A1* | 12/2015 | Zhang ................... | H04L 1/0003 370/329 |

FOREIGN PATENT DOCUMENTS

| | | | |
|---|---|---|---|
| CN | 102958035 A | 3/2013 | |
| CN | 103109507 A | 5/2013 | |
| CN | 103281333 A | 9/2013 | |
| CN | 103329498 A | 9/2013 | |
| CN | 103428484 A | 12/2013 | |
| CN | 103686692 A | 3/2014 | |
| CN | 103733595 A | 4/2014 | |
| EP | 1507372 A1 | 2/2005 | |
| EP | 2547023 A1 | 1/2013 | |
| JP | 2002521935 A | 7/2002 | |
| JP | 2005064961 A | 3/2005 | |
| JP | 2009534983 A | 9/2009 | |
| KR | 20130128006 A | 11/2013 | |
| WO | 0005909 A1 | 2/2000 | |
| WO | 2007129856 A1 | 11/2007 | |
| WO | WO-2008097489 A2 * | 8/2008 | ........ H04W 74/0833 |
| WO | 2012006120 A1 | 1/2012 | |
| WO | 2013010005 A1 | 1/2013 | |
| WO | 2013024522 A1 | 2/2013 | |
| WO | 2013033106 A1 | 3/2013 | |
| WO | 2013122163 A1 | 8/2013 | |
| WO | 2014113686 A2 | 7/2014 | |

OTHER PUBLICATIONS

InterDigital Communications, "User Plane Architecture for Dual-Connectivity", 3GPP TSG-RAN WG #82, 3GPP Draft; R2-131939, 3rd Generation Partnership Project (3GPP), Mobile Competence Centre ; 650, Route Des Lucioles ; F-06921 Sophia-Antipolis Cedex; FR, vol. RAN WG2, No. Fukuoka, Japan; May 20, 2013-May 24, 2013 May 11, 2013 (May 11, 2013 ), XP050700091, 7 Pages. Retrieved from the Internet: URL: http://www.3gpp.org/ftp/tsg_ran/WG2_RL2/TSGR2_82/Docs/ [retrieved on May 11, 2013].
International Search Report and Written Opinion—PCT/US2015/044787—ISA/EPO—dated Nov. 17, 2015.
Pantech, "Considering on PDCP in multiflow", 3GPP TSG-RAN WG2 Meeting #82, 3GPP Draft; R2-131798, 3rd Generation Partnership Project (3GPP), Mobile Competence Centre ; 650, Route Des Lucioles ; F-06921 Sophia-Antipolis Cedex; France, vol. RAN WG2, No. Fukuoka, Japan; May 20, 2013-May 24, 2013 May 11, 2013 (May 11, 2013 ), XP050700056, Retrieved from the Internet: URL: http://www.3gpp.org/ftp/tsg_ran/WG2_RL2/TSGR2_82/Docs/ [retrieved on May 11, 2013].
Ericsson: "L2 Transport of SRBs and Relation to RLF Handling", 3GPP Draft, R2-134221, L2 Transport of SRBs and Relation to RLF Handling, 3rd Generation Partnership Project (3GPP), Mobile Competence Centre, 650, Route Des Lucioles, F-06921 Sophia-Antipolis Cedex, France, vol. RAN WG2, No. San Francisco, USA, Nov. 11, 2013-Nov. 15, 2013, Nov. 13, 2013 (Nov. 13, 2013), XP050736968, 5 pages, Retrieved from the Internet: URL: http://www.3gpp.org/ftp/Meetings_3GPP_SYNC/RAN/RAN2/Docs/. [Retrieved on Nov. 13, 2013] p. 4, figure 5.
Extended European Search Report—EP20180322—Search Authority—The Hague—dated Sep. 7, 2020.
InterDigital Communications: "User Plane Architecture for Dual-Connectivity", 3GPP Draft, R2-131327, User Plane Architecture for Dual-Connectivity, 3rd Generation Partnership Project (3GPP), Mobile Competence Centre, 650, Route Des Lucioles, F-06921 Sophia-Antipolis Cedex, France, vol. RAN WG2, No. Chicago, USA, Apr. 15, 2013-Apr. 19, 2013, Apr. 6, 2013 (Apr. 6, 2013), XP050699485, 7 pages, Retrieved from the Internet: URL: http://www.3gpp.org/ftp/tsg_ran/WG2_RL2/TSGR2_81bis/Docs/. [Retrieved on Apr. 6, 2013] paragraph [2.2.4.1].
Pantech: "The Necessity of RLC Status Report Via Xn on UP 3C", 3GPP Draft, R2-140254, The Necessity of RLC Status Report Via Xn on UP 3C, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Feb. 10, 2014-Feb. 14, 2014, Feb. 9, 2014 (Feb. 9, 2014), XP050791652, 3 pages, Retrieved from the Internet: URL: http://www.3gpp.org/ftp/Meetings_3GPP_SYNC/RAN2/Docs/. [Retrieved on Feb. 9, 2014] pp. 2-3 figure 2.
International Preliminary Report on Patentability—PCT/US2015/044787, The International Bureau of WIPO—Geneva, Switzerland, dated Nov. 28, 2016.
Panasonic: "Signalling Bearer Splitting—Layer 2 Transport of SRB", 3GPP TSG-RAN WG2#84, R2-133936, Jan. 15, 2013, 4

(56) References Cited

OTHER PUBLICATIONS

Pages, Nov. 11, 2013-Nov. 15, 2013, San Francisco, USA, URL: http://www.3gpp.org/ftp/tsg_ran/WG2_RL2/TSGR2_84/Docs/R2-133936.zip.

* cited by examiner

US 11,323,851 B2

MULTICASTING TRAFFIC USING MULTI-CONNECTIVITY

CROSS-REFERENCE TO RELATED APPLICATIONS

The present Application for Patent is a continuation of U.S. Non-Provisional application Ser. No. 14/597,102, filed Jan. 14, 2015, which claims priority to U.S. Provisional Application No. 62/039,227, filed Aug. 19, 2014, each of which is assigned to the assignee of the present application and hereby expressly incorporated by reference herein in its entirety.

BACKGROUND

Field of the Disclosure

The present disclosure relates generally to wireless communication, and more particularly, to methods and apparatus for multicasting traffic using multi-connectivity.

Description of Related Art

Wireless communication systems are being developed with the goal of enabling new services and devices, which will offer new user experiences. One approach to achieve this is to leverage multiple existing radio access technologies (RATs), for example, using a combination of features from wireless wide area networks (e.g., 3G and LTE) and wireless local area networks (e.g., based on WiFi and millimeter wave (mmW)). This approach may help speed development and take advantage of different benefits provided by the different RATs.

One challenge with a system that utilizes multiple RATs is how to optimally route data between a core network and a user, given the different paths offered by the different RATs.

BRIEF SUMMARY

Certain aspects of the present disclosure provide a method of reporting a status for a data flow. The method generally includes determining a data flow is being received from a plurality of connections and reporting, on more than one connection of the plurality of connections, a status for a packet received on the data flow.

Certain aspects of the present disclosure provide a method of transmitting a data flow. The method generally includes determining a data flow is to be transmitted on a plurality of connections, wherein the data flow is sent according to layers in a protocol stack below a layer determined based on a selection of a packet split at an aggregation point, and forwarding data for the data flow on the plurality of connections.

Certain aspects of the present disclosure provide an apparatus for reporting a status for a data flow. The apparatus generally includes means for determining a data flow is being received from a plurality of connections and means for reporting, on more than one connection of the plurality of connections, a status for a packet received on the data flow.

Certain aspects of the present disclosure provide an apparatus for transmitting a data flow. The apparatus generally includes means for determining a data flow is to be transmitted on a plurality of connections, wherein the data flow is sent according to layers in a protocol stack below a layer determined based on a selection of a packet split at an aggregation point, and means for forwarding at least one data packet for the data flow on two or more connections of the plurality of connections.

Aspects also provide various apparatus, systems, computer program products, and processing systems for performing the operations described above.

DETAILED DESCRIPTION

Figure 1:
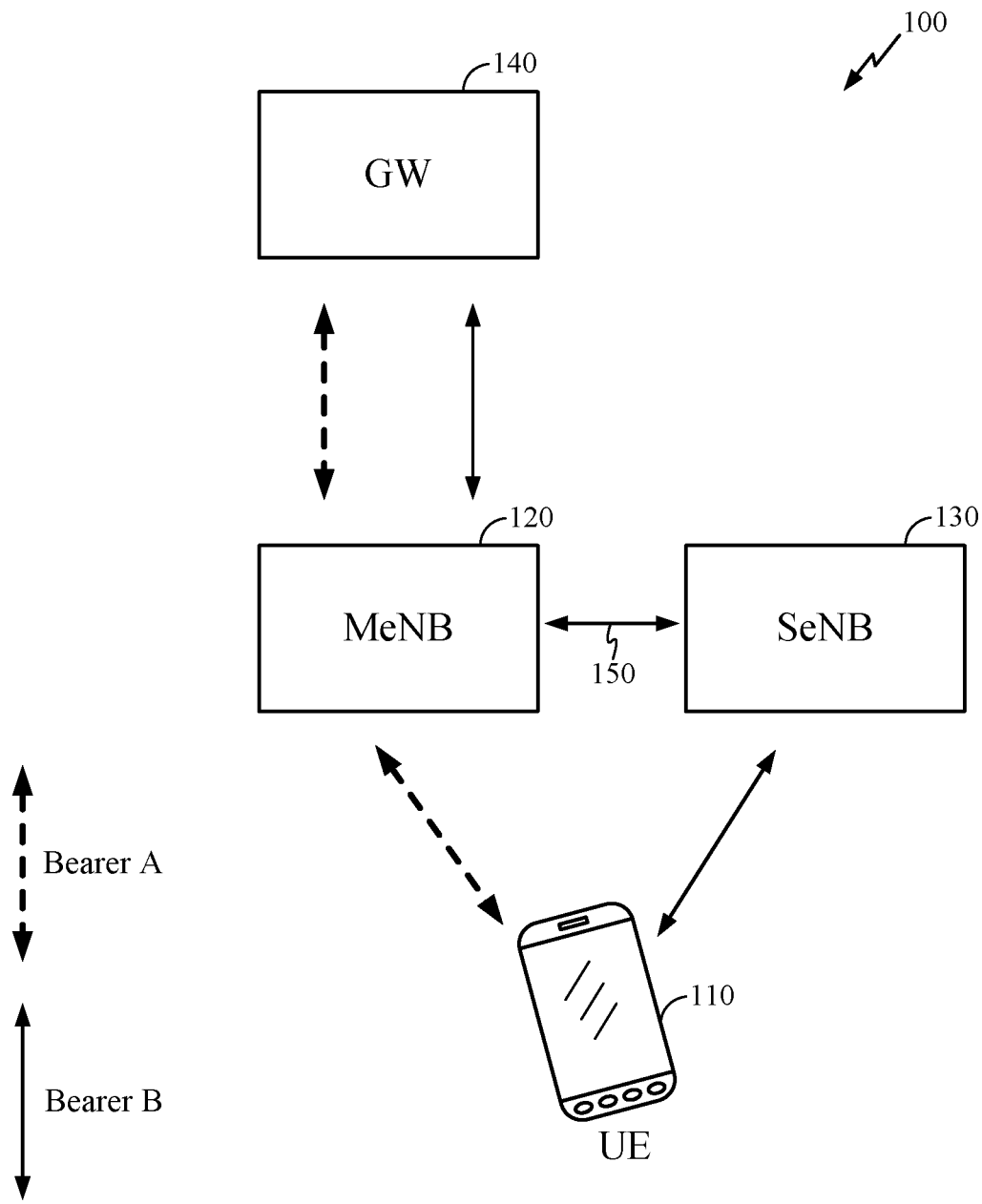
FIG. 1 illustrates an example multi-RAT system in which aspects of the present disclosure may be utilized.

Aspects of the present disclosure provide techniques that may be used to route data between a core network and a user equipment (UE) connected via multiple radio access technologies (RATs). According to certain aspects, a downlink (DL) packet, which follows one path from a core network entity to a user equipment (UE) under current standards (e.g., Rel-12), is sent from the core network to multiple base stations (e.g., eNodeBs and access points) and from each of the base stations to a UE. The UE receives the DL packet from whichever base station (BS) first delivers the DL packet, and then the UE sends a report (e.g., an ACK) reporting receipt of the DL packet back to all of the BSs. BSs that receive a report indicating the UE received the packet can drop the packet, even if the BSs have not yet successfully delivered the packet. According to certain aspects of the present disclosure, an uplink (UL) packet, which follows one path from a UE to a core network entity under current standards (e.g., Rel-12), is sent by the UE to multiple BSs (e.g., eNodeBs and access points) and from the base stations to a core network entity. The core network entity receives the UL packet from whichever base station (BS) first delivers the UL packet, and then the core network entity sends a report (e.g., an ACK) reporting receipt of the UL packet back to all of the BSs. BSs that receive a report indicating the UE received the packet can drop the packet, even if the BSs have not yet successfully delivered the packet.

Aspects of the present disclosure may be applied to a wide variety of different types of mobile devices communicating via a wide variety of different RATs. Different terminology may be used to refer to mobile devices. For example, in some cases depending on the RAT(s) supported thereby, a mobile device may be referred to as a wireless device, user terminal (UT), access terminal (AT), user equipment (UE), station, mobile station, wireless station, wireless node, or the like. Similarly, different terminology may be used to refer to a base station that provides services to a mobile device, such as access to a core network. For example, in some cases depending on the RAT(s) supported thereby, a base station may be referred to as an access point (AP), a node B, an enhanced Node B (eNodeB), or simply an eNB.

In certain examples that follow, a mobile device is referred to as a UE and base stations are referred to as eNBs. Such references are not meant to limit aspects of the present disclosure to any particular RAT or RATs, but are merely to help describe illustrative examples meant to facilitate understanding.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

An Example Wireless Environment

FIG. 1 illustrates an example wireless environment 100, in which aspects of the present disclosure may be utilized to manage data flows between a core network and a wireless device, such as UE 110.

As illustrated, UE 110 may be capable of communicating with multiple base stations, such as a master eNodeB (MeNB) 120 and a secondary eNodeB (SeNB) 130. MeNB 120 and SeNB 130 may communicate via the same RAT or different RATs. For example, MeNB 120 may communicate via a wireless wide area network (WWAN) protocol (e.g. LTE) while SeNB 130 may communicate via a wireless local area network (WLAN) protocol (e.g., WiFi).

As used herein, the term MeNB generally refers to an eNB that terminates an S1-MME (Mobility Management Entity) control plane for the UE, while the term SeNB generally refers to an eNB serving the UE that is not the MeNB. An S1 connection may be used by the MeNB or SeNB to communicate with the core network (CN), for example via a CN gateway (GW) 140. For example, the S1 interface may include an S1-U interface, which serves the data plane between the MeNB or SeNB and the CN GW, and an S1-MME, which serves the control plane.

In certain aspects, the MeNB may be connected to one or more SeNBs to serve a UE via multi-connectivity. The MeNB and SeNB may communicate with one another via a backhaul connection 150 (e.g., an X2 connection). The backhaul connection need not be direct but may be routed through one or more intermediate nodes (e.g., an MME, an interworking gateway function, or a router). The number of SeNBs may be limited, depending on the capabilities of the UE. The MeNB may coordinate mobility and user-plane (U-plane) split procedures within the corresponding operator network. The MeNB may be considered as "access agnostic," meaning it may support any type of RAT both to serve the UE and also for managing the UE configuration of a U-plane split with one or more SeNBs. For example, an MeNB may utilize a common U-plane anchored in the operator's core network (CN) in order to enable procedures to manage the U-plane split via multiple RATs, as described herein.

The SeNB may be utilized as a source of supplemental capacity for the MeNB and may also use a different RAT (from the RAT of the MeNB) to serve the UE. According to aspects of the present disclosure, an SeNB is limited to serving a UE and in most cases may not be used to control the UE configuration of the U-plane split. Having the SeNB as a supplemental capacity for the MeNB may provide an opportunistic and energy efficient operation, which may be initiated by the UE's user or the network operator.

The SeNB may be loosely or tightly coupled with the MeNB, depending on backhaul bandwidth capabilities and latency requirements. For example, an SeNB that is considered tightly coupled with an MeNB may have the SeNB's connection to the UE substantially managed by the MeNB. On the other hand, an SeNB that is considered loosely coupled with an MeNB may leave the SeNB's connection to the UE under the control of the SeNB subject to, for example, general requirements such as Quality of Service (QoS) from the MeNB. For example, an SeNB with a high-capacity and low-latency backhaul link to an MeNB may be tightly coupled with the operations of the MeNB. The SeNB may be used as a supplemental downlink (SDL) or as an additional cell for both uplink (UL) and DL. In some cases, the SeNB may be used to help achieve supplemental mobility robustness of the MeNB, for example, for mission critical applications. For example, the SeNB may provide a redundant path for delivery of critical information and may also provide a fast failover (to the SeNB) in the event the MeNB experiences a radio link failure (RLF).

Multi-connectivity (MC) generally refers to a mode of operation wherein a UE is connected (e.g., radio resource control (RRC) connected) to an MeNB and at least one SeNB, as illustrated in FIG. 1. FIG. 1 shows a specific example of MC, with two different eNBs, that may be referred to as dual connectivity (DC). In MC, a group of serving cells associated with the MeNB, including a primary cell (PCell) and optionally one or more secondary cells (SCells), may be referred to as a master cell group (MCG). Similarly, a group of serving cells associated with the SeNB may be referred to as a secondary cell group (SCG).

Certain aspects of the present disclosure present MC procedures which include procedures to change (add to an SCG, remove from an SCG, or modify the configuration of) one or more cells of an SeNB, while maintaining a current MeNB. As will be described in greater detail below, MC procedures may include various options for offloading data communications using MC, for example, at the packet level, bearer level, or access packet network (APN) level.

MC procedures may also include handover procedures to change the MeNB, e.g., by transferring the functionality of the MeNB for a UE's MC configuration to another eNB, as well as additional aggregation procedures. The aggregation procedures may include procedures to change (add, remove, or modify) a set of one or more secondary component carriers (SCC) of the MeNB and/or an SeNB. In some cases, aggregation may imply a primary component carrier (PCC) controlling one or more secondary component carrier (SCCs) with a common media access control (MAC) layer.

The present disclosure provides various options for aggregation and U-plane splitting, such as aggregation within a same node, (e.g., carrier aggregation) and U-plane splitting across nodes via the radio access network (RAN). For example, for multi-connectivity, a data flow may be split on a per-packet basis or split on a per-bearer basis (e.g., split over the X2 interface instead of the S1 interface).

In some cases, the U-plane may also be split across nodes via the CN, for example, via a bearer-split using multi-connectivity. That is, a CN sending data via multiple bearers e.g., Bearer A and Bearer B in FIG. 1, to a UE may use multi-connectivity to assign one bearer to an MeNB and a second bearer to an SeNB, and send data packets to the MeNB and SeNB based on which bearer each packet is traversing.

Another option for aggregation and U-plane splitting is non-seamless offload, which may include offloading to another operator (if allowed), for example, if session continuity is not necessary. This may be considered equivalent to per-packet splitting if multi-path transmission control protocol (MP-TCP) is available, otherwise the split may occur at the Internet protocol (IP) flow level. Another option is multi-casting (e.g., bi-casting) traffic wherein, for example, each packet is served by both the MeNB and SeNB for greater reliability.

Aspects of the present disclosure describe several possible considerations for making aggregation and U-plane split decisions. In some cases, aggregation in a node may utilize a common MAC layer. The aggregated PCC and SCC(s) may have compatible control channels and timing requirements, but may not require a separate UL channel (e.g., for acknowledging transmissions) for the SCC(s).

In some cases, per-packet U-plane splitting performance may be optimized to support multiple access links across RATs with different latencies and link error rates. Similarly, per-packet U-plane splitting performance may be optimized across licensed, shared, and/or unlicensed bands, and for cells sharing the same carrier and/or for cells on separate carriers.

Example Protocol Stack Configurations for Aggregation and User Plane Splitting

Figure 2A:
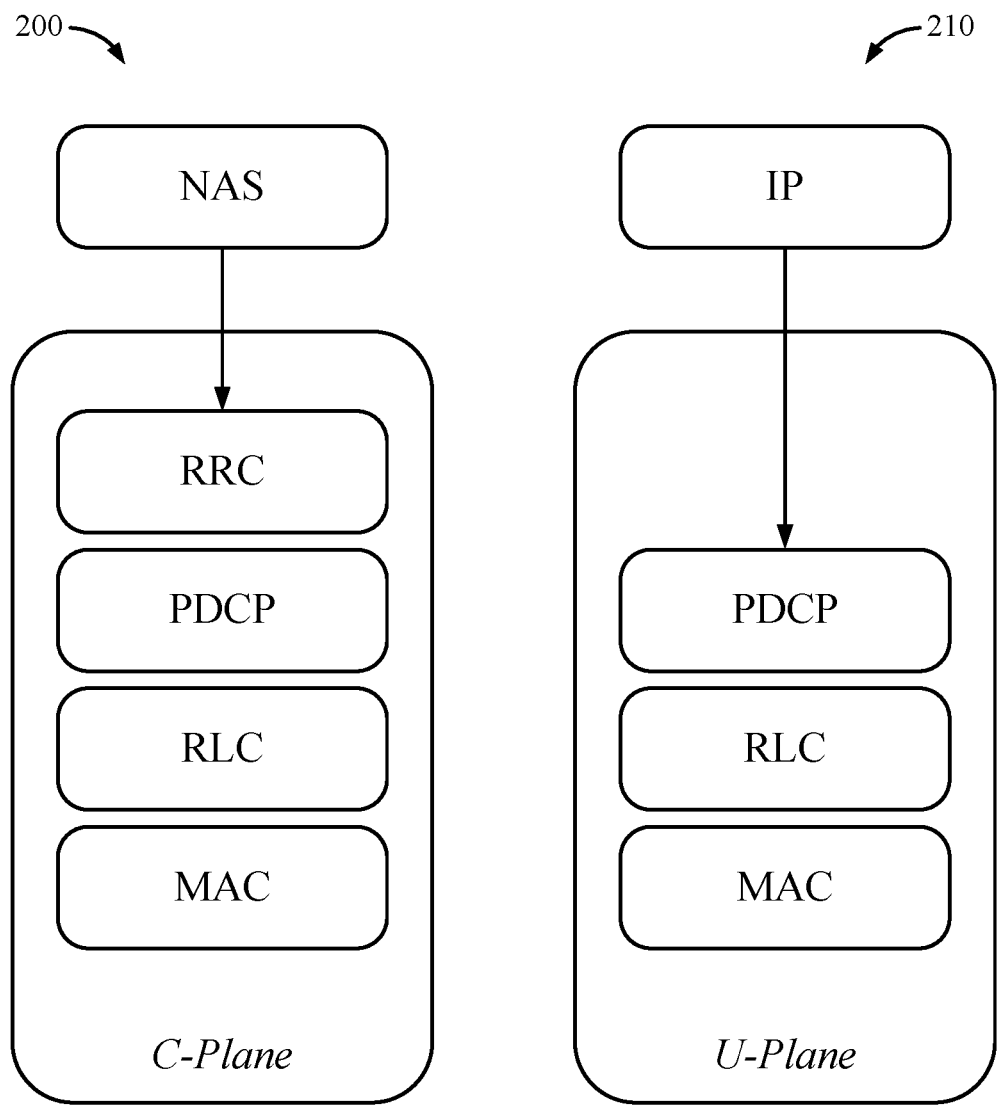
FIGS. 2A and 2B illustrate example protocol layers for control plane and user plane routing, in accordance with certain aspects of the present disclosure.

Different options for U-plane splitting may be described with reference to wireless communication protocol stacks, such as the Long Term Evolution (LTE) C-plane stack 200 and U-plane stack 210 shown in FIG. 2A. In the C-plane, a non-access stratum (NAS) message is received by the radio resource control (RRC) layer and is passed down to the packet data convergence protocol (PDCP) layer, radio link control (RLC) layer and media access control (MAC) layer. In the U-plane, an IP packet is received by the PDCP layer and passed down to the RLC layer and MAC layer.

As mentioned above, different levels of U-plane splitting are possible, with different corresponding considerations when making routing decisions. For example, for a per-bearer or per IP flow split, a decision of where to serve each IP packet may be based on a Traffic Flow Template (TFT) associated with the bearer or IP flow. In this case, a common PDCP layer or RLC layer may not be required between different serving nodes as there is no reordering issue between serving nodes, since all the IP packets for a flow are routed through the same serving node. That is, because the packets are routed based on which bearer or flow the packets belong to, all of the packets for any given flow arrive at the UE from one serving node, and the receiving UE can determine the correct order of the packets from indicators supplied by the node.

When packets of a flow arrive from multiple serving nodes, the indicators (e.g., sequence numbers) used by the nodes may conflict, and the receiving UE cannot determine the proper order of the packets. For example, in the case of a per-bearer or per-IP-flow split, the split may occur at a serving gateway (SGW) via an S1 interface (e.g., for MC) or at a packet data network gateway (PGW) or home agent (HA) (e.g., for WLAN interworking), resulting in packets for the bearer or IP flow being delivered to multiple serving nodes which may then assign their own indicators to the packets without coordination. For the UE to reassemble the packets in the correct order, some coordination or additional information must be provided. As an example, the node at which the split occurs may provide packet identifiers that determine a sequence of packets for the bearer, irrespective of the serving node that delivers a particular packet. A RAN-only solution may also be possible via an interface between serving nodes, e.g., an X2 interface.

For U-plane splitting on a per-packet basis, a common PDCP layer (for MC) across serving nodes may be utilized to reorder the packets in a flow, while RLC re-ordering may also be possible. In the case of U-plane splitting on a per-packet basis, the per-packet decision of where to serve each PDCP packet may be based on scheduling requirements (e.g., bandwidth available at transmission times) on each eNB. According to certain aspects of the present disclosure, flow control may be defined between the MeNB and SeNB to allow the MeNB and SeNB to make the per-packet determinations of where to serve each PDCP packet.

In certain systems (e.g., current LTE), mobility and aggregation are generally based on the principle that a UE is served by a single serving eNB on the C-plane, meaning that RRC and NAS signaling are only sent to the UE via a single eNB. In some versions of these systems, a UE may also be served by up to 2 serving eNBs on the U-plane, and by multiple (e.g., up to 5 in Release 12 of LTE) cells across the 2 serving eNBs.

Figure 2B:
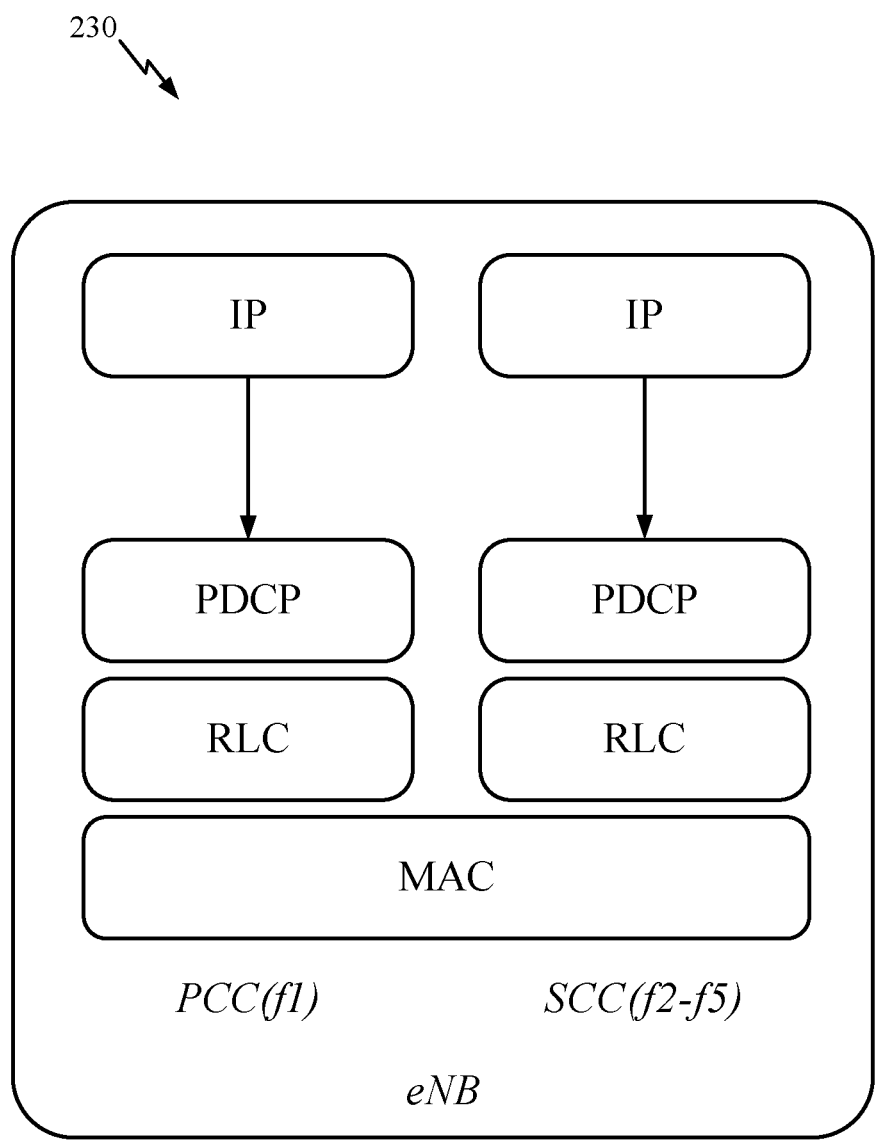

FIG. 2B illustrates an example configuration 230 of carrier aggregation for the U-plane protocol stack for an eNB having a primary component carrier (PCC) f1 and secondary component carriers (SCCs)f2-f5 in current wireless communication systems (e.g., LTE Rel-10). In carrier aggregation (CA), reconfiguration, addition, and removal of secondary cells (SCells) within a single serving eNB may be performed by the RRC function. The primary cell (PCell), belonging to the same eNB, is used for transmission of physical uplink control channels (PUCCH), and NAS information is taken from the PCell. Cross-carrier scheduling, via a carrier indicator field (CIF), allows the physical downlink control channel (PDCCH) of a serving cell (e.g., the PCell) to schedule resources on another serving cell. Unlike SCells, it may not be possible to remove or deactivate a PCell.

A PCell serving a UE may be changed with a handover procedure (i.e. with a security key change and RACH procedure). For handover from one LTE PCell to another LTE PCell, RRC functions can also add, remove, or reconfigure SCells for usage with the target PCell. As a result, the UE may be able to handover (HO) to a target eNB and continue CA without the re-establishing connections to SCells serving the UE. Re-establishment of connections by the UE is triggered when the PCell serving the UE experiences RLF, but not when SCells experience RLF. UEs operating in a CA system generally receive data faster due to the increased available bandwidth in a CA system than in a system without CA.

Figure 3:
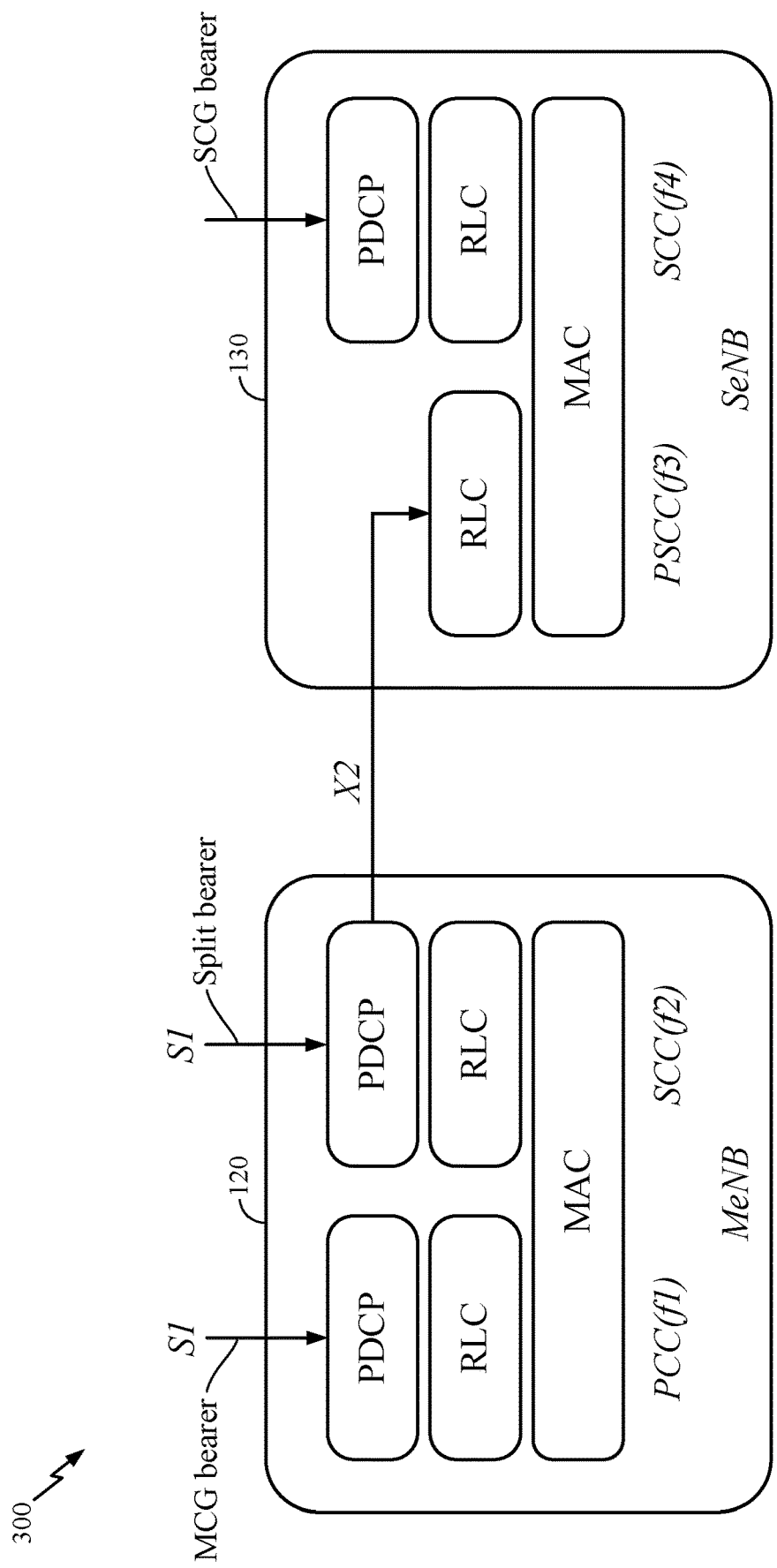
FIG. 3 illustrates an example multi-connectivity protocol stack, in accordance with aspects of the present disclosure.

FIG. 3 illustrates an example configuration 300 of a dual connectivity protocol stack linking (via an X2 connection) an MeNB and an SeNB. The protocol stack for a particular bearer generally depends on how that bearer is setup. For example, various alternative types of bearer exist: MCG bearers, split bearers, and SCG bearers. For MCG bearers (e.g., the left bearer in FIG. 3), the MeNB is U-plane connected to the S-GW via an S1-U interface and the SeNB is not involved in the transport of user plane data for this bearer. For split bearers (e.g., the middle bearer in FIG. 3), the MeNB is U-plane connected to the S-GW via an S1-U interface and, in addition, the MeNB and the SeNB are interconnected via an X2-U interface, allowing both the MeNB and the SeNB to deliver U-plane data to the UE. For SCG bearers (e.g., the right bearer in FIG. 3), the SeNB is directly connected with the S-GW via an S1-U interface.

Signaling radio bearers (SRB) are typically of the MCG bearer type and, therefore, use radio resources provided by the MeNB. At least one cell in SCG typically has a configured UL RRC connection, and one of them is configured with PUCCH resources, which may be used for control procedures (e.g., data scheduling) that do not require the existence of an SRB. As noted above, re-establishment may be triggered when the PCell experiences RLF, but not when an SCell experiences RLF. The MeNB maintains the radio resource management (RRM) measurement configuration of the UE and may decide to request an SeNB to provide additional resources (serving cells) for a UE (e.g., based on received measurement reports or traffic conditions or bearer types). In this case, the MeNB and the SeNB may exchange information about UE configuration by means of RRC containers (inter-node messages) carried in X2 messages. In DC, two cell radio network temporary identifiers (C-RNTI) are typically independently allocated to a UE, one for use in communicating with the MCG, and one for use in communicating with the SCG.

Example User Plane Offload Options

As used herein, the term offload generally refers to the breaking out (i.e., offloading) of data at an earlier point in the path. For example, if data is routed from one path (e.g., through an MeNB and an SeNB) to a shorter path (e.g., through an SeNB only), then the data is said to be offloaded. For example, a UE may be said to be operating with minimal offload for a flow, if all data is routed through a GW in the CN via an MeNB. The UE may be said to be operating with local offload for a flow, if all data is routed through a LGW in the MeNB while the UE may be said to be operating with maximum offload for the flow if all the data is routed through a LGW in the SeNB and does not traverse the MeNB.

As used herein, the term User plane (U-plane) splitting generally refers to how the traffic is delivered from the GW to the UE. As will be described in greater detail below, decisions regarding where to offload traffic and how to configure U-plane splitting may be based on the data service requirements and other considerations (e.g., available resources and radio frequency (RF) conditions of potential offload targets).

Figure 4:
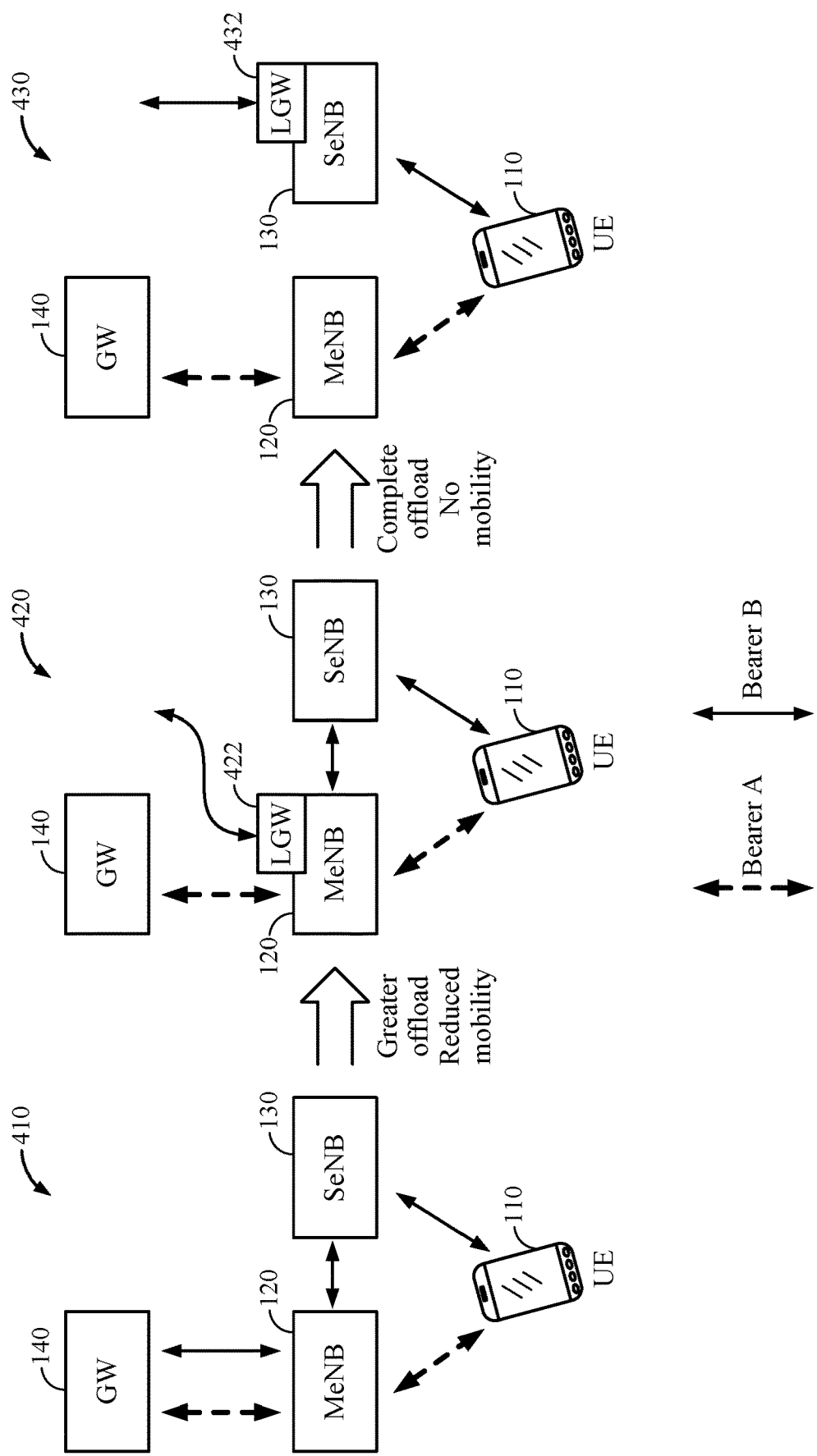
FIG. 4 illustrates example offload configuration, in accordance with aspects of the present disclosure.

FIG. 4 illustrates various U-plane offload options. In a first configuration 410, the GW 140 for U-plane data, such as operator services and voice over LTE (VoLTE), may be in the core network (CN). In the first configuration, the U-plane data may be described as minimally offloaded (from the perspective of the core network), because the common gateway 140 is upstream of the MeNB and SeNB.

In a second configuration 420, the GW may be at the MeNB (shown as local or logical gateway LGW) for traffic requiring "local" session continuity within the service area of the MeNB, such as selected internet IP traffic offload (SIPTO) at the RAN. In the second configuration, the "local" session traffic may be described as being in a greater offload (e.g., more offloaded) than the traffic in the first configuration because the local gateway 422 is located at the MeNB, meaning that data handling (e.g., routing) for such traffic can take place at the MeNB rather than at nodes in the core network.

In a third configuration 430, the LGW 432 is at the SeNB for non-seamless traffic (e.g., SIPTO at a local network). In the third configuration, the non-seamless traffic may be described as completely (or maximally) offloaded, as the gateway is located at the SeNB, and thus none of the traffic traverses the MeNB or the network operator gateway. Mobility for the services provided to the UE decreases as the offload increases, because mobility (e.g., handovers) are managed by the MeNB, but the offloaded traffic is traversing and even being managed by the SeNB.

Decisions on where and how to offload data may have significant impacts on performance and implementation complexity. For example, data offload in the RAN may reduce overall U-plane traffic at the CN and enable efficient access to local services. However, this same offload may impact user experience for highly mobile UEs due to the need to relocate or modify the gateway functionality if the UE changes cells, and may also increase backhaul connectivity requirements for data forwarding between cells for local session continuity.

Figure 5:
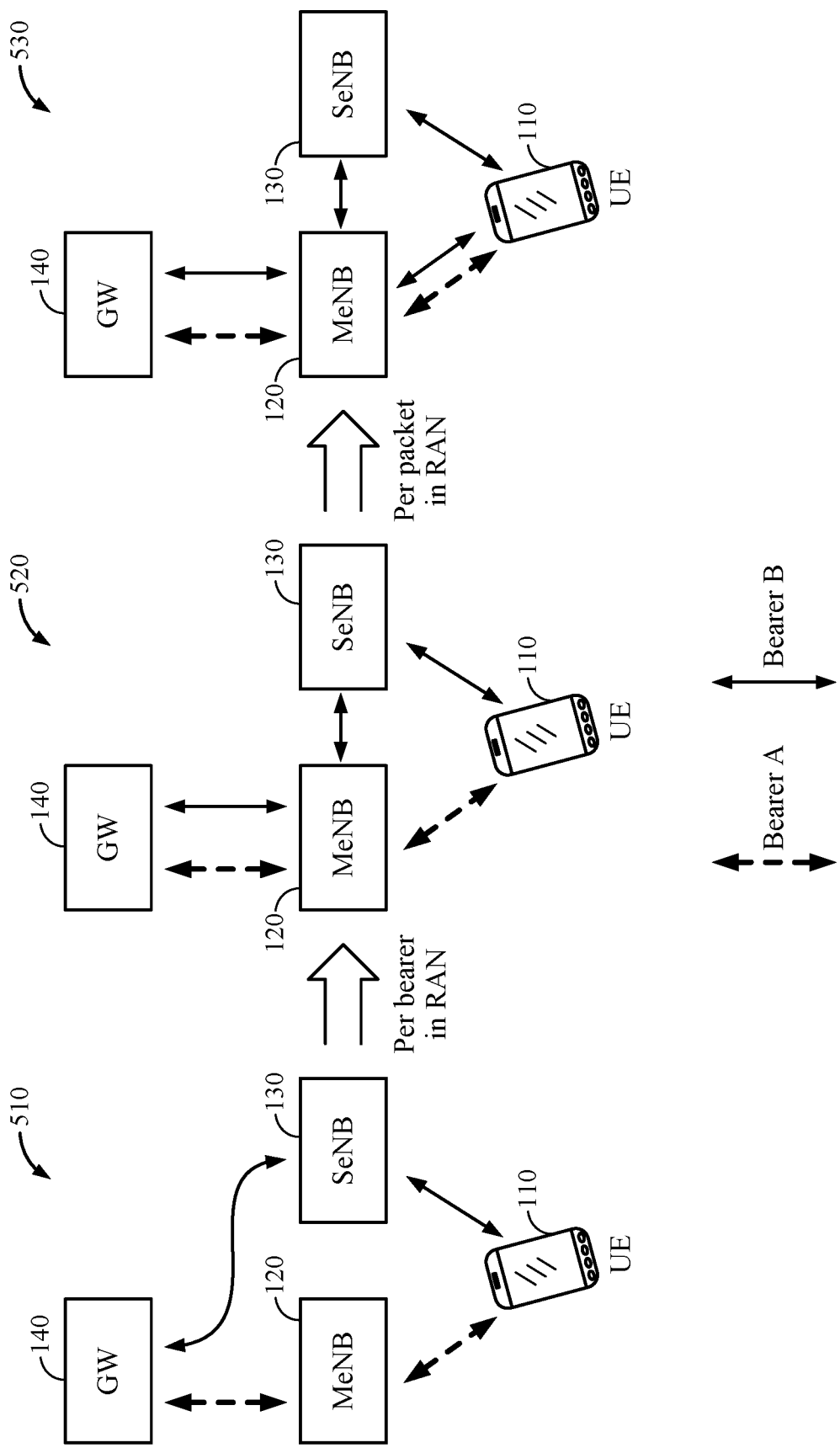
FIG. 5 illustrates example user plane (U-plane) splitting configurations, in accordance with aspects of the present disclosure.

FIG. 5 illustrates three example U-plane splitting options. U-plane splitting configurations generally define how and where bearers are served by the network and UE for seamless connectivity. Decisions regarding whether U-plane data is split on a per-packet basis (packet splitting) or a per-bearer basis (bearer splitting) may be based on coupling between the MeNB and SeNB. In addition, the decisions may be a function of UE capability and backhaul availability As illustrated, in a first configuration 510, U-plane data may be routed to or from the core network GW 140 via the SeNB 130. This is an example of bearer splitting in the core network.

A second configuration 520 shows per-bearer U-plane splitting (or simply bearer splitting) in the RAN. That is, the packets are routed based on which bearer each packet is for by the core network in configuration 510 and by the RAN in configuration 520.

A third configuration 530 shows per-packet U-plane splitting (or simply packet splitting) in the RAN. As illustrated, in this configuration, some packets for a bearer are served by the MeNB while other packets are served by the SeNB.

For bearer splitting, there may be no need to route, process and buffer bearer traffic served by the SeNB at the MeNB. As a result, there is no need to route all traffic to the MeNB, which may allow for less stringent requirements on the backhaul link between the MeNB and the SeNB (e.g., less bandwidth demands and higher latency tolerated). In addition, bearer splitting may provide support of SIPTO and content caching at the SeNB, as well as independent protocol stacks on each link as there is no requirement for coordinated flow control between the two links.

In some cases, packet splitting may have advantages over bearer splitting. For example, for bearer splitting the offloading may need to be performed by a mobility management entity (MME) configuring the tunnels (e.g., IPSec tunnels or other protocol tunnels) at the SGW and, as a result, dynamic changes to the configuration of bearers may be limited and may require SeNB mobility to be visible to the CN. That is, if a UE moves out of the service area (e.g., a cell) of an SeNB, the CN must be informed so that the CN can reconfigure the bearers for the UE. For bearers handled by the SeNB, handover-like interruption may occur with SeNB changes, with data forwarding between SeNBs. Further, utilization of radio resources across an MeNB and an SeNB for the same bearer may not be possible in many cases.

Packet splitting may enable CA-like gains across cells and fine granularity load balancing (as routing decisions are made per-packet rather than per-bearer). Packet splitting may also enable more dynamic bearer switching based on cell loading and may also reduce CN signaling as SeNB mobility may be partly or entirely hidden from the CN. That is, the CN may not be informed of a UE moving out of a service area of a particular SeNB, as the CN forwards the packets to the RAN, and the RAN determines which SeNB (or the MeNB) delivers the packet to the UE. Further, as routing decisions are made per-packet, no data forwarding between SeNBs may be required upon a change of the SeNB (e.g., when changing SeNBs, packets may simply not be routed to an SeNB being de-activated), thus relaxing requirements for SeNB mobility. In addition, utilization of radio resources across MeNB and SeNB for the same bearer may be possible.

In some cases, bearer splitting may have advantages over packet splitting. For example, packet splitting may require routing, processing and buffering all traffic in the MeNB and may also increase backhaul connectivity requirements, relative to bearer splitting, for data forwarding between cells, and packet splitting does not readily support SIPTO or content caching at the SeNB. In addition, packet splitting may require coordinated flow control and may result in more complex protocol stacks (relative to bearer splitting) to account for different links and over the air (OTA) and backhaul latencies.

Example Control Plane Options

Various RRC functions may be relevant for the SeNB operation used in MC routing. For example, common radio resource configurations of an SeNB, dedicated radio resource configurations, and measurement and mobility control for the SeNB, may be relevant to MC routing.

Figure 6:
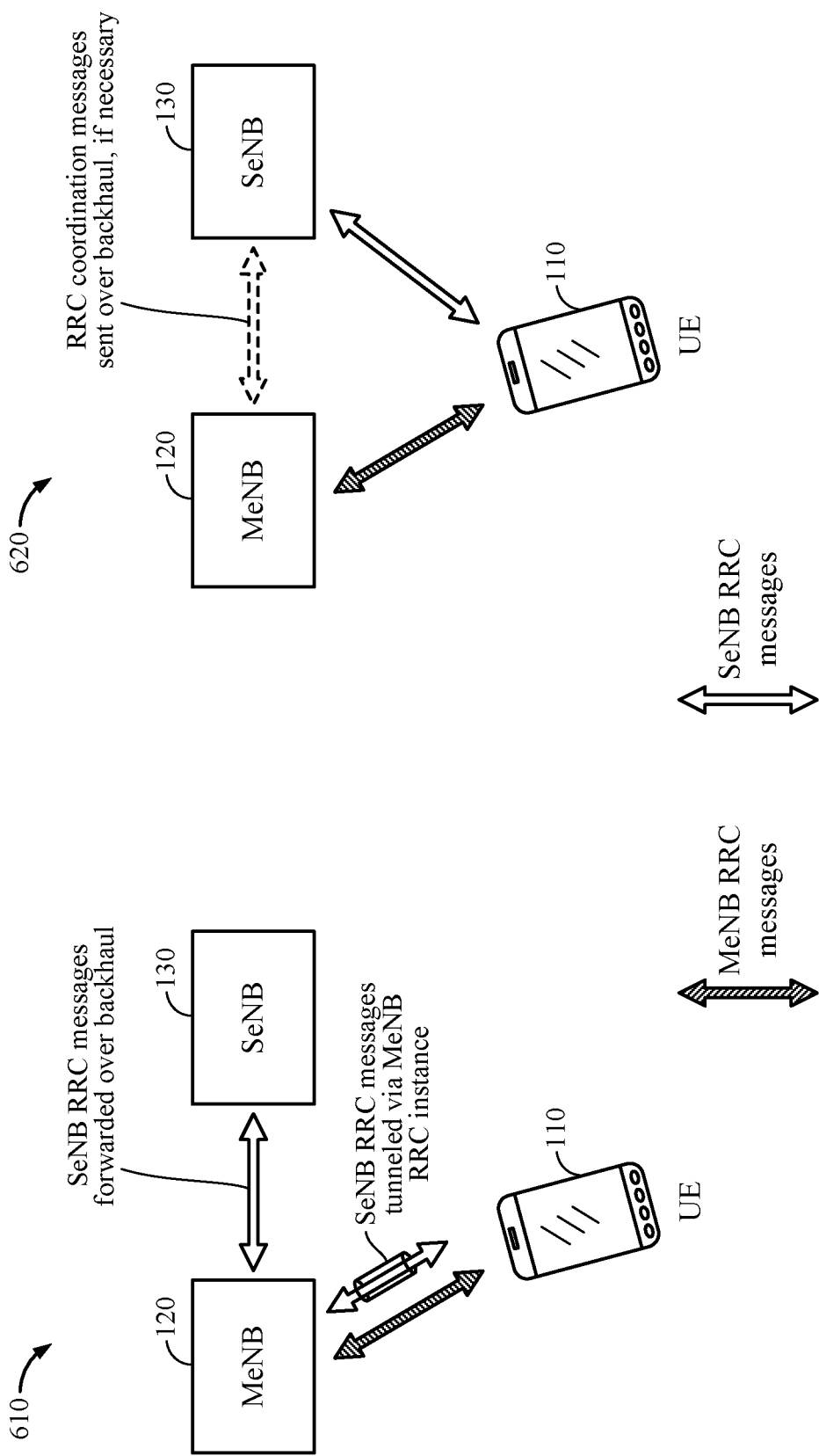
FIG. 6 illustrates example control plane (C-plane) logical architecture options, in accordance with aspects of the present disclosure.

FIG. 6 illustrates example control plane logical architecture options for RRC. In some cases, the RRC packets for the MeNB 120 may be sent to the MeNB via the SeNB 130 and forwarded over the backhaul (configuration 620) and/or vice versa (configuration 610). In this case, the RRC messaging (or other RAT equivalent signaling) may need to support an address scheme over the air (OTA) to identify the target (whether MeNB or SeNB) for the packet.

As illustrated by configuration 610, the RRC logical architecture may include a single RRC instance in an MeNB, wherein any RRC messages delivered via an SeNB are tunneled via the MeNB RRC instance. As illustrated by configuration 620, the RRC logical architecture may also include separate RRC (or equivalent) instances in the MeNB and the SeNB, for example, with the separate independent instances managing the air link configuration. In this case, coordination over X2 may be needed for UE configuration, for example, the MeNB and SeNB may coordinate to assign common or mutually compatible discontinuous reception (DRX) parameters to the UE.

In some cases, the RRC functionality allowed in the SeNB may only be a subset of the full RRC functionality (e.g., if only the MeNB manages mobility of the UE in connecting to the SeNB and U-plane splitting configuration). In this case, the RRC instance in the MeNB may be considered a primary RRC and the RRC instance in the SeNB may be considered a secondary RRC. In some cases, the SeNB may be associated with a different RAT as compared to the MeNB, which may be similar to having separate systems as there may be no requirement for the MeNB to manage the configuration of the SeNB air link to the UE.

Figure 7:
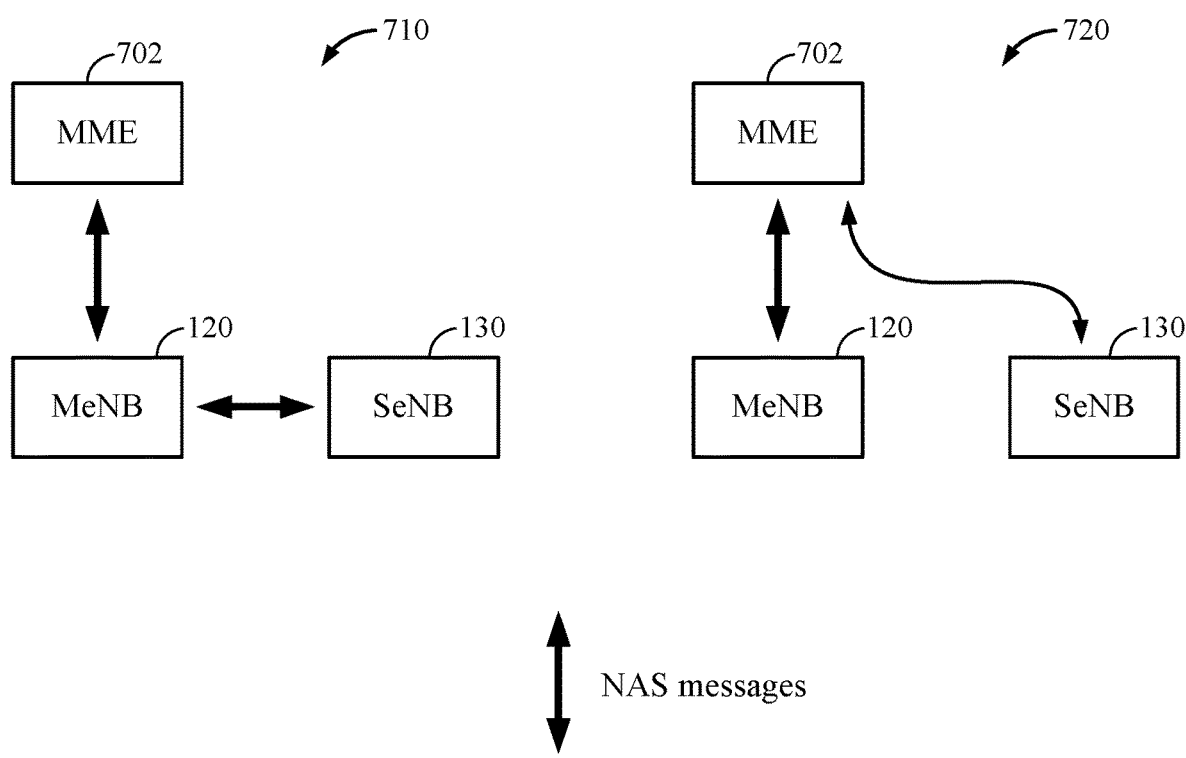
FIG. 7 illustrates example control plane (C-plane) NAS logical architecture options, in accordance with aspects of the present disclosure.

FIG. 7 illustrates C-plane NAS logical architecture options. The NAS logical architecture options include a single NAS instance in an MME 702, served by lower layer transport through a single MeNB 120 as illustrated by configuration 710. The protocol stack in the MeNB provides transport for NAS messages exchanged by the UE with the MME. In this logical architecture, NAS messages may or may not be sent through the SeNB 130, depending on the RRC logical architecture used with the NAS architecture. NAS messages to be sent through the SeNB are forwarded to the SeNB from the MeNB (for delivery from the MME to the UE), or forwarded to the MeNB from the SeNB (in case of delivery from the UE to the MME).

A second C-plane NAS logical architecture option is to include an independent instance in each of the MeNB and the SeNB of a protocol layer capable of delivering messages to a NAS instance in the MME (e.g., an RRC layer), as illustrated by configuration 720. In the second NAS architecture, the MME 702 exchanges NAS messages via both the MeNB 120 and the SeNB 130. In such an architecture the MME may operate a single NAS protocol instance with the ability to coordinate separate communications with the SeNB and the MeNB. The protocol layer implemented in the SeNB for communication with the NAS layer in the MME may comprise only a subset of the underlying protocol; e.g., an RRC layer in the SeNB may not support all functions of a complete RRC instance, as described further below.

A particular example implementation of a C-plane NAS and RRC logical architecture may have separate RRC (or equivalent) instances in an MeNB and an SeNB with a single NAS in the MeNB. The separate RRC instances may require some coordination over X2 for dedicated and common resources in order to serve the UE, although this coordination may be invisible to the UE. As noted above, the RRC instance in the SeNB may only be a subset of a full RRC (e.g., the RRC of the MeNB may act as a primary RRC which manages mobility of the UE to the SeNB and U-plane splitting configuration, and the RRC of the SeNB may act as a secondary RRC with limited functionality, such as having only the ability to provide transport for NAS messages without supporting the mobility and resource management functions that would normally be present in a fully implemented RRC protocol instance). NAS messages from the single NAS instance in the MeNB may be sent to either the MeNB or the SeNB. A new procedure may be used to reconfigure the SeNB to function as an MeNB for a particular UE, for example, as a "failover" mechanism in the case of RLF on the MeNB.

Example Control Plane Mobility

Figure 8:
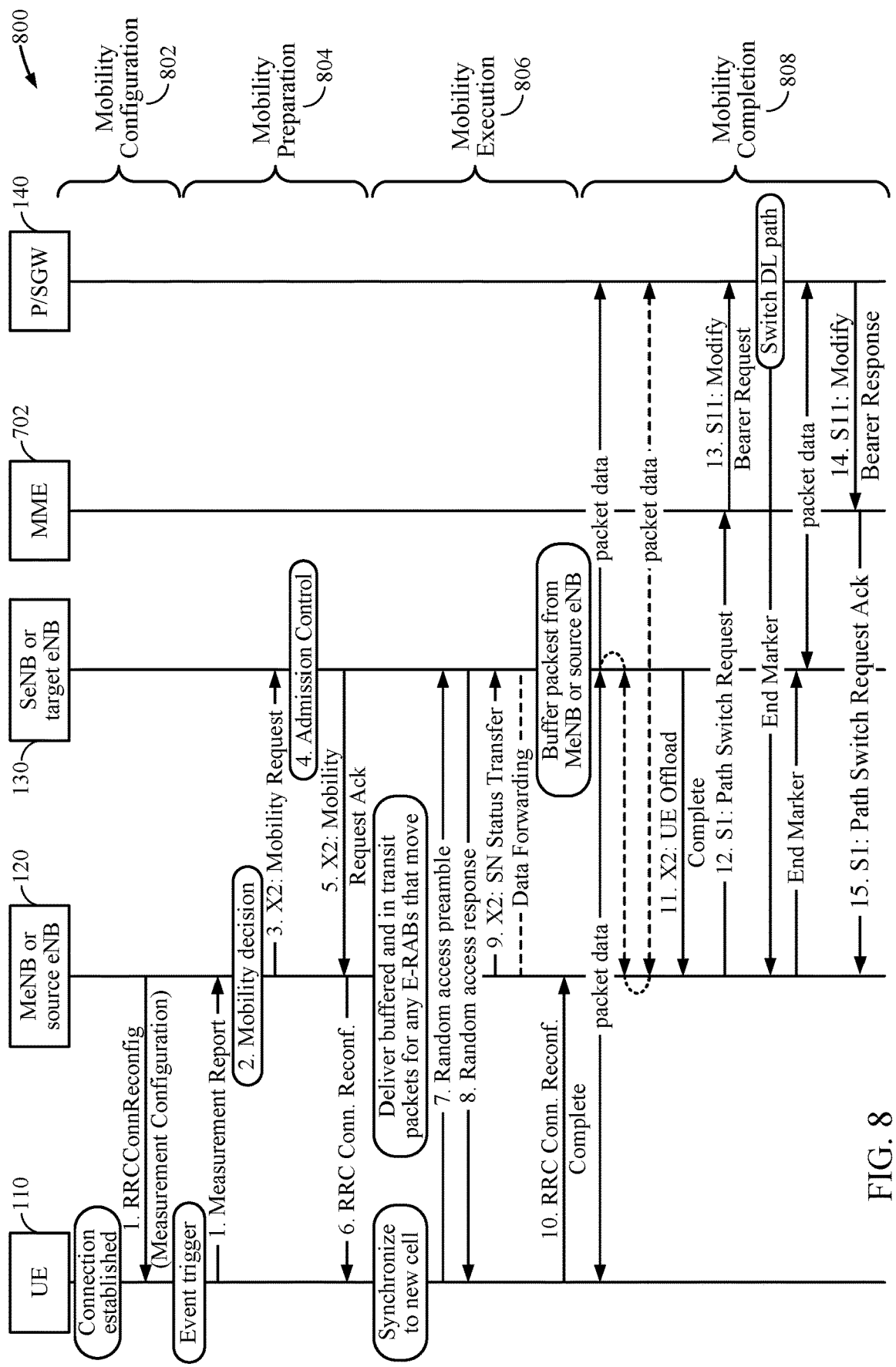
FIG. 8 illustrates an example call flow diagram of a UE, a master eNodeB (MeNB), and a secondary eNodeB (SeNB), in accordance with aspects of the present disclosure.

FIG. 8 illustrates an example call flow diagram 800 for a C-plane mobility procedure, where a DC data path is shown as a dashed line for PDCP aggregation. As illustrated, the C-plane mobility procedure may occur in four general phases. The four phases apply for mobility during both handover and multi connectivity. The four phases may include a UE mobility configuration phase 802, a RAN mobility preparation phase 804, a mobility execution phase 806, and a mobility completion phase 808.

The UE mobility configuration phase 802 begins with, for example, the UE establishing a connection and receiving, from the MeNB, a measurement configuration. UE mobility configuration allows the RAN to configure the UE to set the RF triggers for mobility. This includes the RF conditions on the serving cell, neighbor cells (both intra and inter RAT), and relative conditions between the serving and neighbor cells. The UE mobility configuration includes service and context aware events. For example, based on a specific traffic type, the UE may perform measurements on frequencies or other resources to trigger mobility events to RATs or channel resources specific to a certain type of traffic (e.g., a type defined by latency or other QoS aspects, low power requirements for the UE, or a content type, e.g., Multimedia Broadcast Multicast Service (MBMS)). In certain aspects, the network may provide configuration, including context and service configuration, for a UE to determine when to perform HO measurements (UE-centric measurement triggering). In other aspects, the UE provides context and service state to the network, and the network triggers measurement events based on the state (network-centric measurement triggering). Both UE- and network-centric measurement triggering may be in use in a single system, e.g., for different event types.

During the RAN mobility preparation phase 804, the UE context is provided to the SeNB or a target eNB. For example, the UE sends a measurement report to the MeNB, which makes a mobility decision based on the measurement report. The MeNB then, for example, sends a mobility request via the X2 connection to the target eNB (the prospective SeNB) to perform admission control. For backward HO, the UE context is sent to the target eNB before the HO or DC event, for example, triggered based on the UE measurement report in response to the mobility configuration. For forward HO, the context is sent after the HO event, i.e., sending the context is triggered as a pull from the target eNB in response to the UE establishing a connection at the target eNB and identifying the source eNB. The backward-HO approach would typically be expected for multi-connectivity mobility events, but the forward-HO approach is also possible, Sending the context after the HO or DC event (the forward-HO model) may provide a potential for more efficient preparation of multiple target eNBs, when compared to sending the context before the HO event. Moreover, sending the context after the HO or DC event may allow for differentiation between handovers within a cloud or cluster and handovers to a BS outside the cloud or cluster. For example, for intra cloud handover, coordinated multipoint (CoMP) concepts may be extended to provide a single logical context across the cloud that does not change when the point of attachment changes, and actual HO (e.g., transferring the control-plane function for the UE from one eNB to another) may only be needed for inter cloud UE mobility.

During the mobility execution phase 806, the UE may establish a connection at the SeNB or target eNB. The newly established connection allows UL and DL data to be communicated via the SeNB or target eNB. For example, the SeNB sends a mobility request acknowledgement via the X2 connection to the MeNB. The MeNB then sends an RRC connection reconfiguration message to the UE. The UE then synchronizes to the new cell, sends a random access preamble to the SeNB, and receives a random access response from the SeNB. The MeNB then sends the sequence number (SN) status transfer message to the SeNB and begins data forwarding. This approach may provide the potential to perform an inter-cluster HO while maintaining IP connections via selected IP traffic offload (SIPTO) and local IP access (LIPA). In addition, this approach may allow optimized procedures to assign a new IP address on HO, as well as enabling more make before break (as compared to current HO techniques) for mission critical applications, due to multi connectivity. MPTCP can be used (e.g., end-to-end) if required, or applications can be multi-homed or designed to handle IP address changes.

During the mobility completion phase 808, the network moves any tunnels associated with the SeNB or target eNB and the SGW to point directly to the SeNB or target eNB and in the case of HO, releases resources on the source eNB.

Example Multicasting Traffic Using Multi-Connectivity

As described above, when a UE is connected to a core network via multi-connectivity (e.g., dual connectivity), data for a bearer may be transmitted to or from the UE via the MeNB or the SeNB.

According to certain aspects of the present disclosure, for certain mission critical services, in order to help ensure data delivery reliability requirements (e.g., packet loss, latency requirements, or QoS requirements) are met, a UE may be configured to send the same duplicate packet to both the MeNB and SeNB. By sending duplicate packets to both the MeNB and the SeNB, the probability of successful and timely delivery of the packet, to core network servers for example, may be increased. Similarly, downlink packets for certain services may also be duplicated and sent to the UE via both the MeNB and SeNB.

According to aspects of the present disclosure, such duplicate packets may be sent using a new type of bearer, referred to herein as a duplicate-delivery bearer. According to aspects of the present disclosure, the duplicate-delivery bearer may be used to exchange data between a core network and a UE connected via multi-connectivity (e.g., via an MeNB and one or more SeNBs).

In some cases, when a duplicate-delivery bearer is used for communications, the MeNB is U-plane connected to the S-GW via an S1-U bearer, and the MeNB and the SeNB are interconnected via an X2-U interface. Thus, the duplicate-delivery bearer may be similar to a combination of the MCG bearer and SCG bearer, described above with reference to FIG. 3.

Figure 9A:
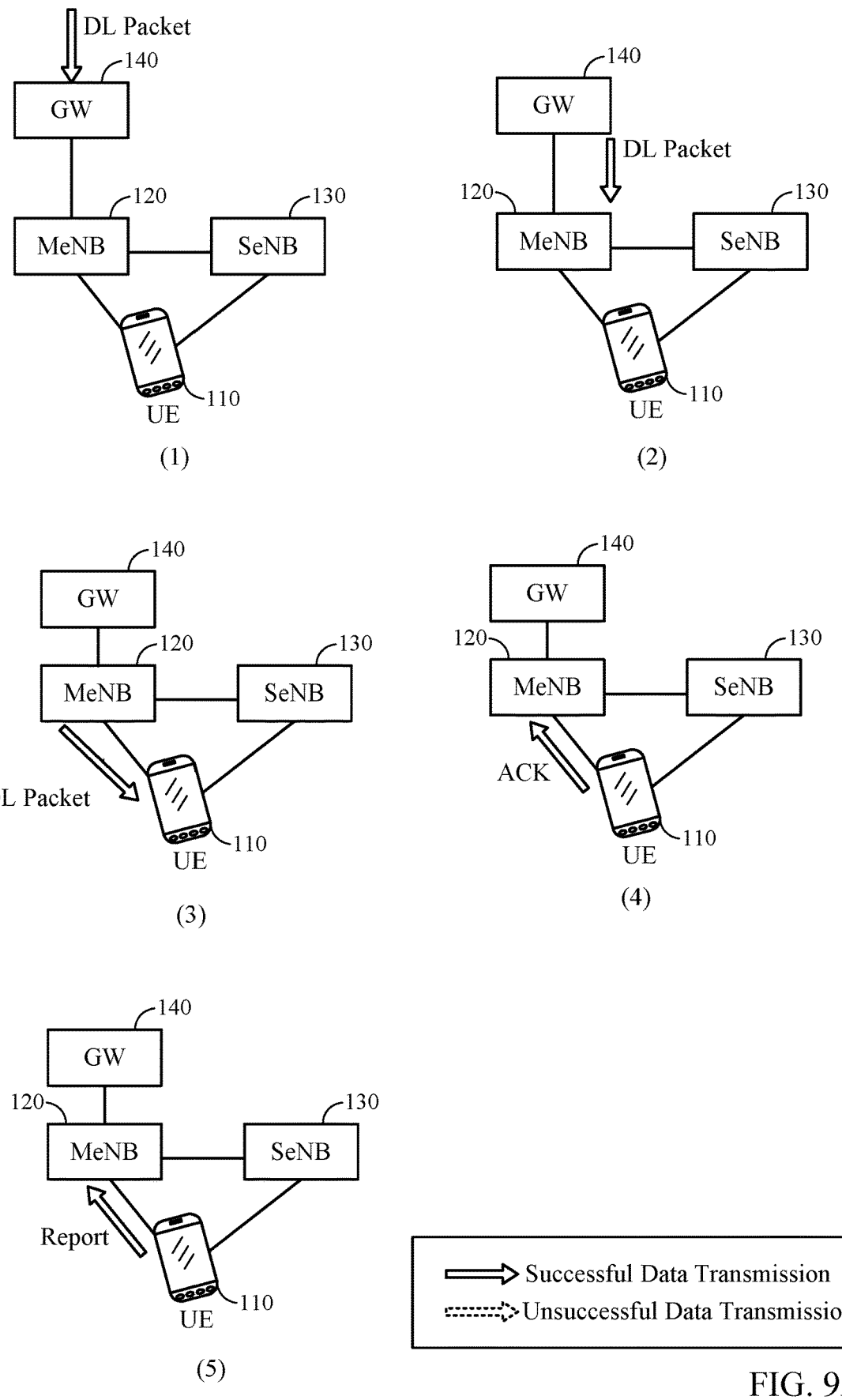
FIGS. 9A and 9B illustrate exemplary exchanges of messages using multi-connectivity, according to aspects of the present disclosure.
Figure 9B:
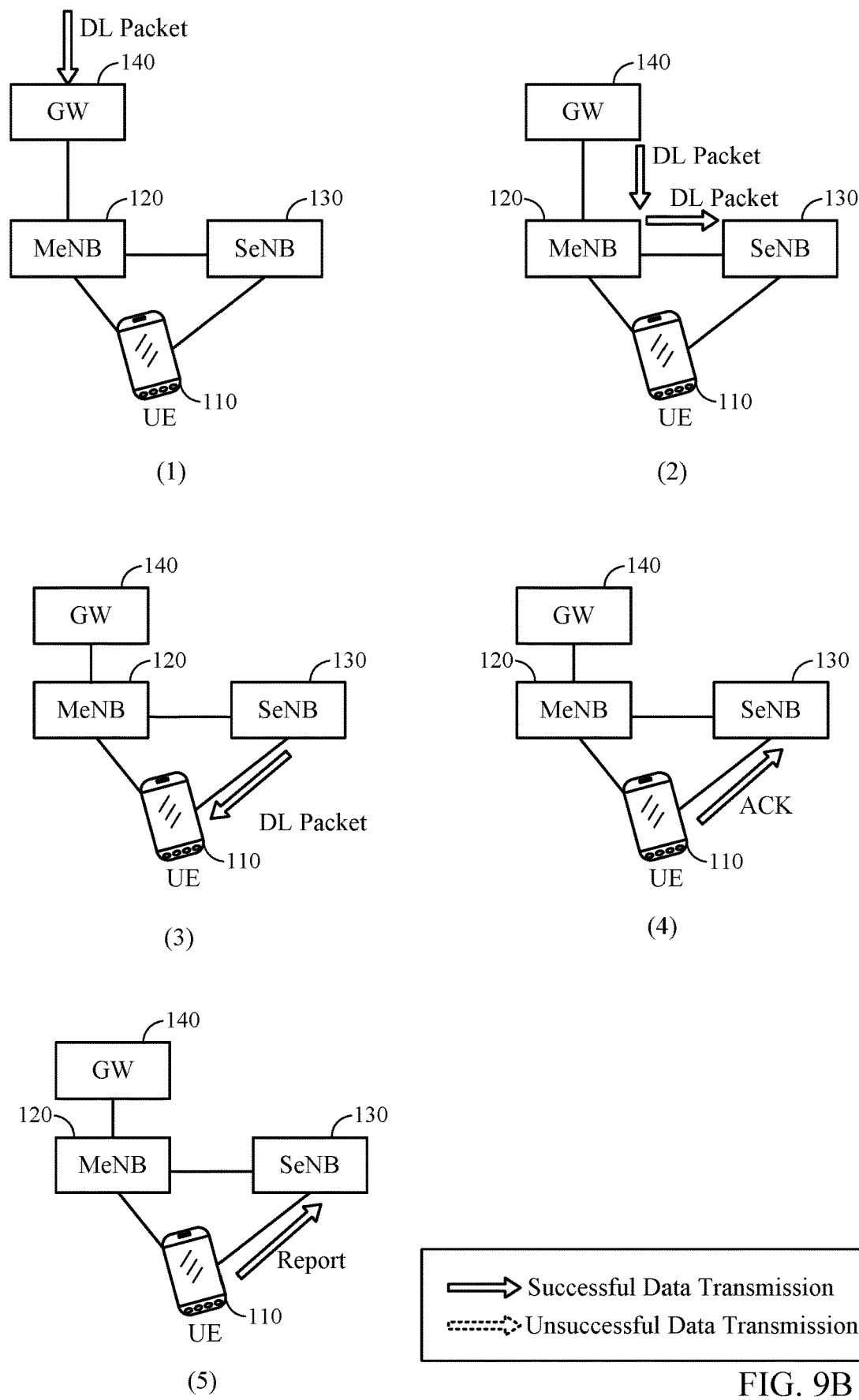

FIGS. 9A and 9B illustrate examples of transmitting packets using multi-connectivity, according to aspects of the present disclosure. The examples involve exchanges of messages between a gateway (GW), an MeNB, an SeNB, and a UE. The exchange of messages may be performed according to current (e.g., Rel-10) techniques.

Turning to FIG. 9A, at (1), gateway 140 receives a DL packet addressed to the UE 110. At (2), the gateway sends the DL packet to the MeNB 120, which determines, based on, e.g., channel conditions or scheduling constraints, to deliver the packet to the UE. The MeNB buffers the packet prior to delivery to the UE. At (3), the MeNB delivers the DL packet to the UE. At (4), the UE sends an ACK to the MeNB. At (5), the UE sends a report (e.g., a PDCP or RLC status report, or a bitmap indicating acknowledged and non-acknowledged packets) to the MeNB indicating that the UE has received the DL packet. When the MeNB receives the report, the MeNB flushes the packet from the buffer of the MeNB. If delivery of the packet to the UE is unsuccessful, then the UE does not report receipt of the packet, and the MeNB may retransmit (not shown) the packet to the UE.

Turning to FIG. 9B, at (1), the gateway 140 receives a DL packet addressed to the UE 110. At (2), the gateway sends the DL packet to the MeNB 120, which determines, based on, e.g., channel conditions or scheduling constraints, to forward the packet to the SeNB 130 for delivery to the UE. The MeNB forwards the packet to the SeNB, and the SeNB buffers the packet prior to delivery to the UE. At (3), the SeNB delivers the DL packet to the UE. At (4), the UE sends an ACK to the SeNB. At (5), the UE sends a report (e.g., a PDCP or RLC status report, or a bitmap indicating acknowledged and non-acknowledged packets) to the SeNB indicating that the UE has received the DL packet. When the SeNB receives the report, the SeNB flushes the packet from the buffer of the SeNB. If delivery of the packet to the UE is unsuccessful, then the UE does not report receipt of the packet, and the SeNB may retransmit (not shown) the packet to the UE.

While the examples illustrated in FIGS. 9A and 9B show only a single SeNB, the disclosure is not so limited and includes larger numbers of SeNBs. The illustrated examples show DL packets being sent from a core network entity to a UE, but the disclosure is not so limited and may be similarly applied to UL packets being sent from a UE to a core network entity.

FIGS. 10A, 10B, 10C, and 10D illustrate examples of transmitting duplicate packets using multi-connectivity, according to aspects of the present disclosure. The examples involve exchanges of messages between a gateway (GW), an MeNB, an SeNB, and a UE. The exchanges of messages may be performed using a duplicate-delivery bearer, as previously described.

Figure 10A:
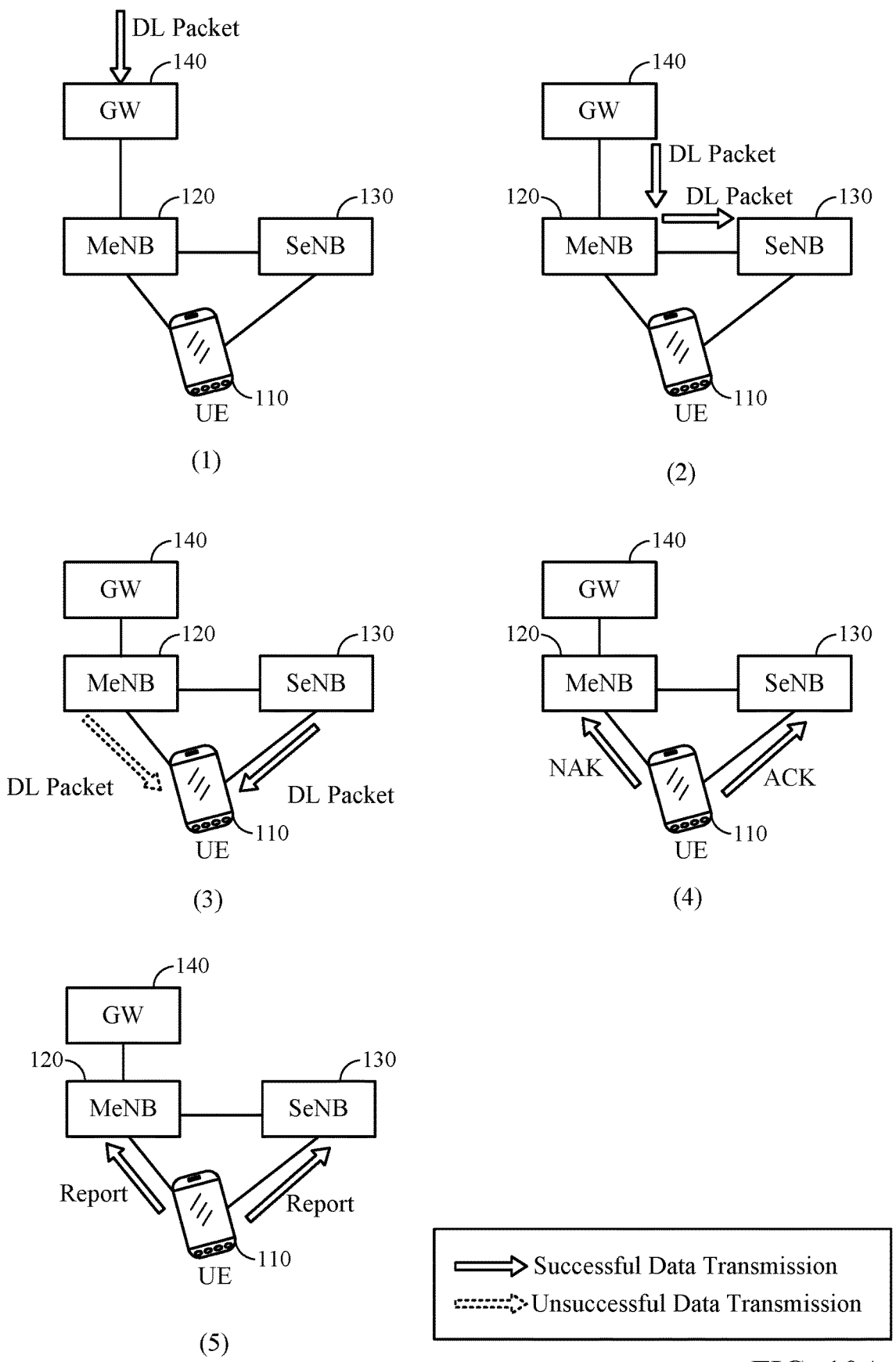
FIGS. 10A, 10B, 10C, and 10D illustrate exemplary exchanges of messages using multi-connectivity, according to aspects of the present disclosure.

Referring first to FIG. 10A, at (1), by the gateway 140 receives a DL packet, of a data flow configured for multi-connectivity, addressed to the UE. At (2), the gateway sends the DL packet to the MeNB 120, which in turn sends a duplicate of the DL packet to the SeNB 130 for delivery to the UE 110. The MeNB and the SeNB both buffer the packet prior to attempting delivery to the UE. At (3), the MeNB and the SeNB attempt to deliver the DL packet to the UE. At (4), the UE sends an ACK to the MeNB and a NAK to the SeNB.

In the example shown in FIG. 10A, the MeNB is unsuccessful in delivering the packet (e.g., due to interference). The MeNB and the SeNB may not coordinate when they send the packet when they are delivering the DL packet to the UE. This exchange of messages is different from a soft handover exchange of messages, in that each of the MeNB and the SeNB sends the packet independently (for example, each of the MeNB and SeNB may independently schedule the packet to be sent on the PDSCH of the MeNB and SeNB respectively), while in soft handover, the source eNB and target eNB coordinate sending a packet in time and air link resources. In addition, each of the MeNB and the SeNB receives a separate ACK or NAK at the MAC layer, while in soft handover, a source eNB and a target eNB both receive a single ACK or NAK sent by a UE at the MAC layer to both the source eNB and the target eNB.

At (5), the UE determines the received packet was received via a duplicate-delivery bearer and sends a report (e.g., a PDCP or RLC status report, or a bitmap indicating acknowledged and non-acknowledged packets) to the MeNB and the SeNB indicating that the UE has received the DL packet. The MeNB and the SeNB receive the report from the UE and each flush the packet from their respective buffers. The MeNB flushes the packet without attempting a retransmission, despite that the MeNB did not successfully deliver the packet at 1006.

Figure 10B:
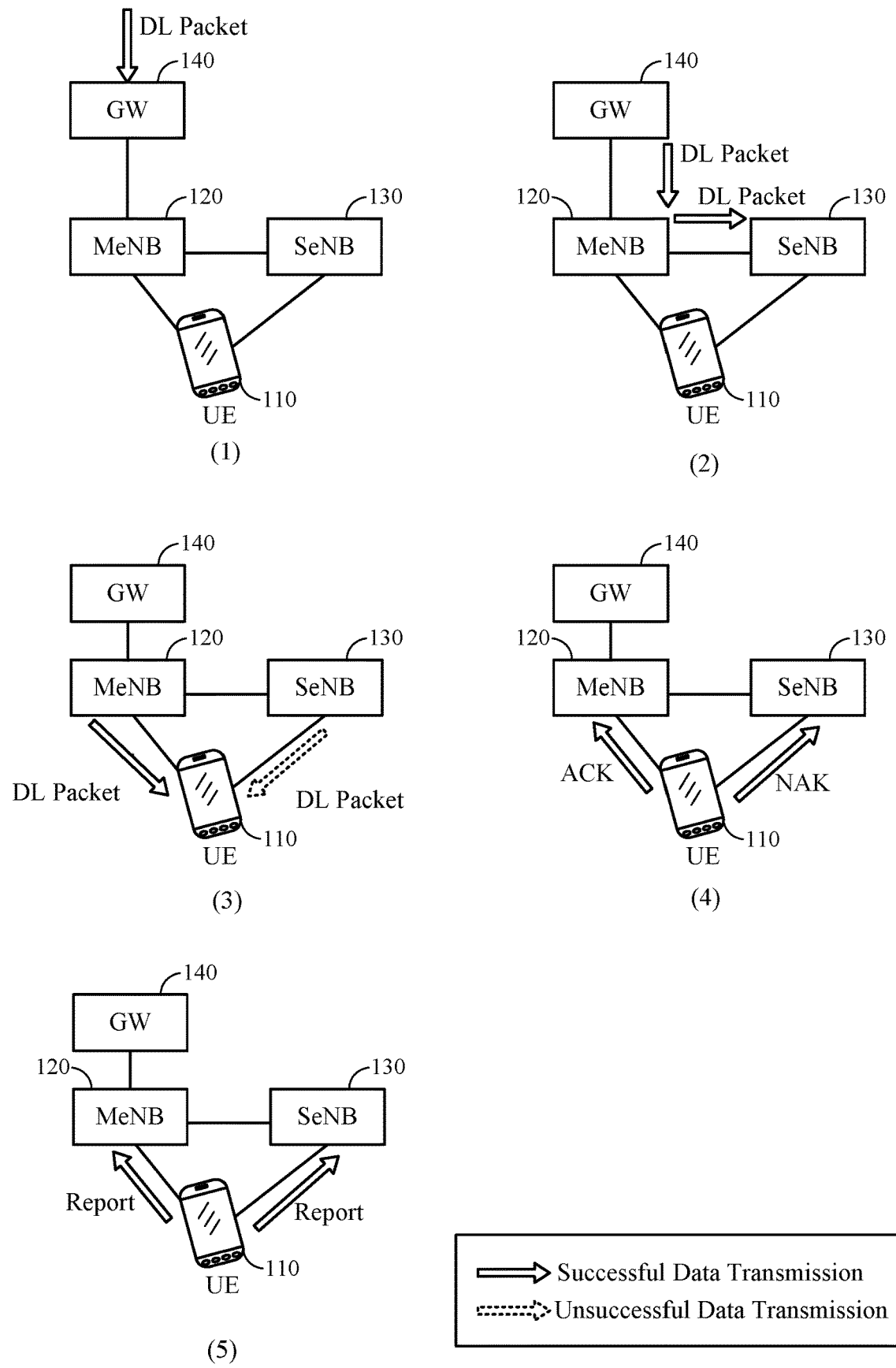

Turning to FIG. 10B, at (1), the gateway 140 receives a DL packet, of a data flow configured for multi-connectivity, addressed to the UE. At (2), the gateway sends the DL packet to the MeNB 120, which in turn sends a duplicate of the DL packet to the SeNB 130 for delivery to the UE 110. The MeNB and the SeNB both buffer the packet prior to attempting delivery to the UE.

At (3), the MeNB and the SeNB attempt to deliver the DL packet to the UE. In this example, the SeNB is unsuccessful in delivering the packet (e.g., due to interference). As above, the MeNB and the SeNB may not coordinate when they send the packet when they are delivering the DL packet to the UE. At (4), the UE sends an NAK to the MeNB and an ACK to the SeNB. At (5), the UE determines the received packet was received via a duplicate-delivery bearer and sends a report (e.g., a PDCP or RLC status report, or a bitmap indicating acknowledged and non-acknowledged packets) to the MeNB and the SeNB indicating that the UE has received the DL packet. The MeNB and the SeNB receive the report from the UE and each flush the packet from their respective buffers. The SeNB flushes the packet without attempting a retransmission, despite that the SeNB did not successfully deliver the packet at (3).

Figure 10C:
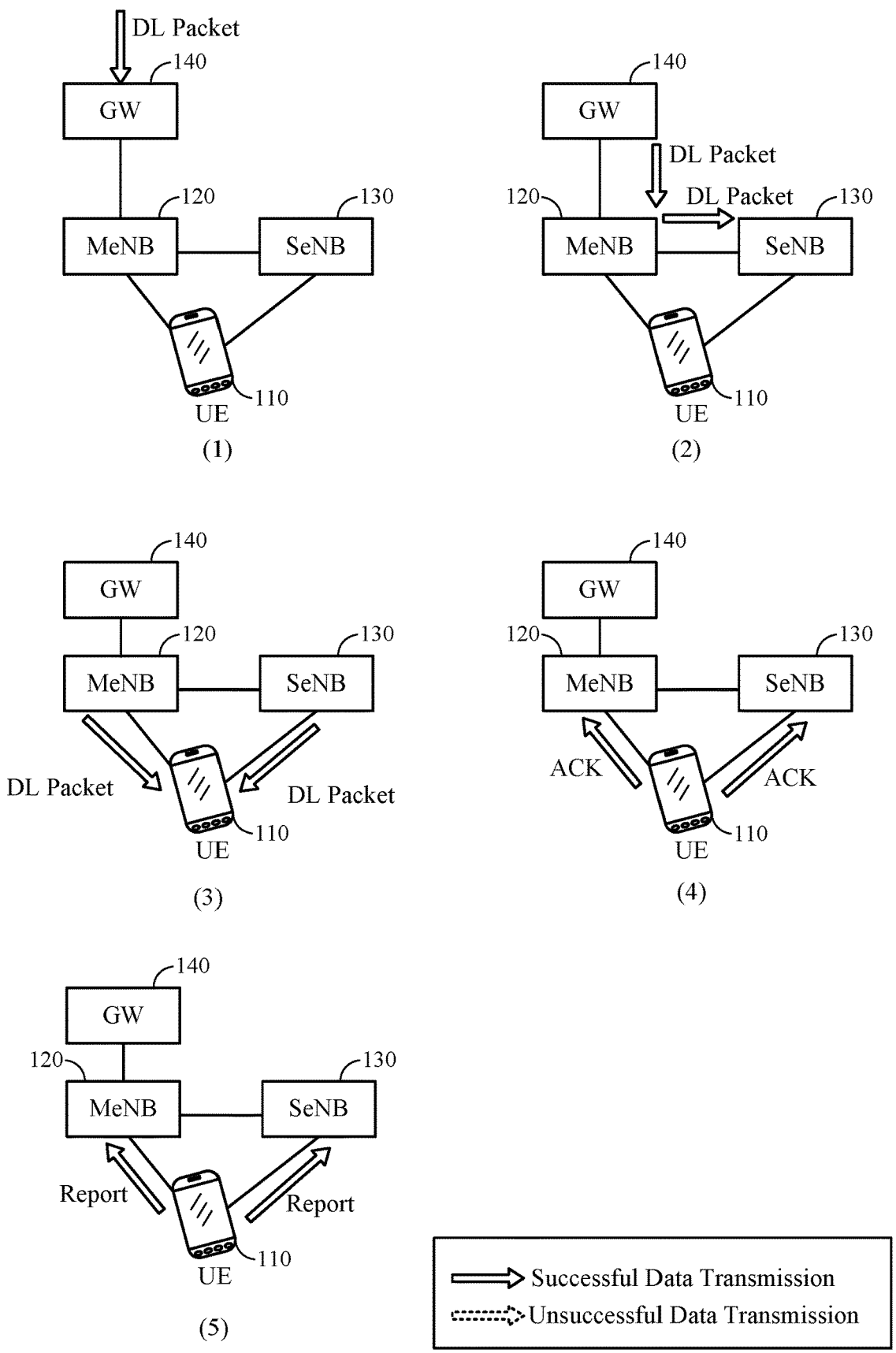

In FIG. 10C, at (1), the gateway 140 receives a DL packet, of a data flow configured for multi-connectivity, addressed to the UE. At (2), the gateway sends the DL packet to the MeNB 120, and, as above, the MeNB sends a duplicate of the DL packet to the SeNB 130 for delivery to the UE 110. As above, the MeNB and the SeNB both buffer the packet prior to attempting delivery to the UE.

Similarly to above, at (3), the MeNB and the SeNB deliver the DL packet to the UE. As above, the MeNB and the SeNB may not coordinate when they send the packet when they are delivering the DL packet to the UE. At (4), the UE sends an ACK to the MeNB and an ACK to the SeNB. At (5), the UE determines the received packet was received via a duplicate-delivery bearer and sends a report (e.g., a PDCP or RLC status report, or a bitmap indicating acknowledged and non-acknowledged packets) to the MeNB and the SeNB indicating that the UE has received the DL packet.

The MeNB and the SeNB receive the report from the UE and each flush the packet from their respective buffers. According to certain aspects, the MeNB and the SeNB may deliver the packet at different times, and the UE may send a report reporting receipt of the packet in response to each of the deliveries at the different times.

Figure 10D:
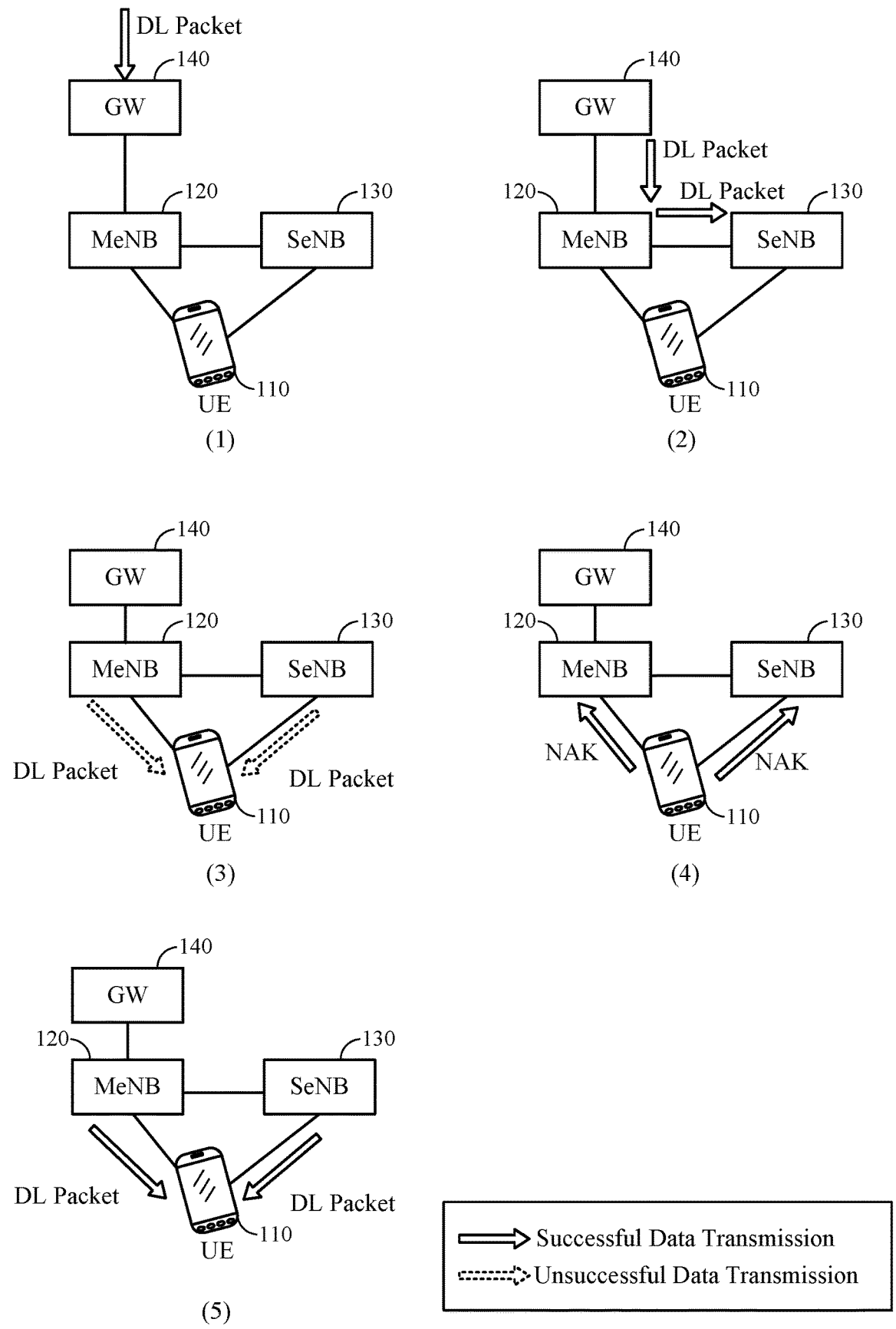

Turning to FIG. 10D, at (1), the gateway 140 receiving a DL packet, of a data flow configured for multi-connectivity, addressed to the UE. As in FIGS. 10A, 10B, and 10C, at (2), the gateway sends the DL packet to the MeNB 120, which in turn sends a duplicate of the DL packet to the SeNB 130 for delivery to the UE 110. As above, the MeNB and the SeNB both buffer the packet prior to attempting delivery to the UE.

At (3), the MeNB and the SeNB attempt to deliver the DL packet to the UE, but both are unsuccessful (e.g., due to interference). As above, the MeNB and the SeNB may not coordinate when they send the packet when they are attempting delivery. At (4), the UE sends an NAK to the MeNB and a NAK to the SeNB. At (5), the MeNB and the SeNB each determine that the UE has not reported receipt of the packet, and attempt retransmission of the packet to the UE. If the NAK is not received, the MeNB and SeNB may, for example, start a timer at (3) and wait for the timer to expire before determining that retransmission should be attempted at (5).

In the examples in FIGS. 10A, 10B, 10C, and 10D, both the MeNB and SeNB attempt to deliver the DL packet to the UE. In some cases, however, one of the eNBs may actually deliver the DL packet before the other eNB is able to attempt delivery of the DL packet (e.g., due to different transmission delays, different queuing delays, different backhaul delays, or different interference).

In cases where an eNB does not attempt delivery, if the other eNB successfully delivers, then the communication exchange is similar to those shown in FIGS. 10A and 10B, with the UE reporting receipt of the packet to both the MeNB and the SeNB, and the MeNB and SeNB both flushing the packet from their respective buffers. The MeNB and SeNB may operate using the example protocol stacks shown in FIG. 3. The reports from the UE refer to an identifier for the packet (e.g., a packet sequence number) that refers to the duplicate packets at the common PDCP layers shown in FIG. 3, so that the MeNB and SeNB may identify the delivered packet as the same as a packet awaiting delivery (e.g., buffered) on the MeNB or SeNB. In such cases, to avoid an unnecessary transmission, an eNB that receives a report (e.g., an ACK) referring to a packet it has not yet delivered may refrain from delivering that packet.

While the examples illustrated in FIGS. 10A, 10B, 10C, and 10D each show only a single SeNB, the disclosure is not so limited, and includes larger numbers of SeNBs. As above with reference to FIGS. 9A and 9B, the examples in FIGS. 10A, 10B, 10C, and 10D each show DL packets being sent from a core network entity to a UE, but the disclosure is not so limited and may be similarly applied to UL packets being sent from a UE to a core network entity.

Figure 11:
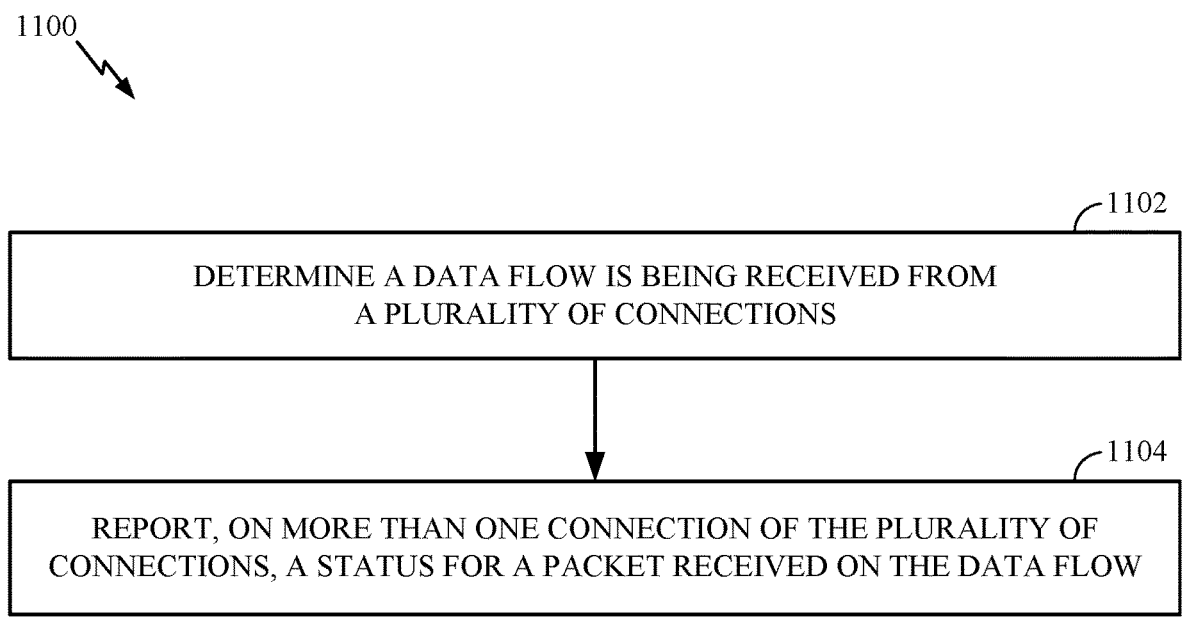
FIG. 11 sets forth example operations that may be performed by a user equipment (UE), according to aspects of the present disclosure.

FIG. 11 sets forth example operations 1100 for reporting a status for a data flow in which duplicate packets are being received from more than one connection (i.e., multi-connectivity), according to aspects of the present disclosure. The operations 1100 may be performed, for example, by a UE, such as the UE 110 shown in FIGS. 10A, 10B, 10C, and 10D.

The operations begin, at 1102, by the UE, for example, determining a data flow is being received from a plurality of connections. At 1104, the operations continue by the UE, for example, reporting, on more than one connection of the plurality of connections, a status for a packet received on the data flow. Examples of these operations are illustrated above with reference to FIGS. 10A, 10B, and 10C.

According to certain aspects of the present disclosure, the data flow is sent according to layers in a protocol stack below a layer determined based on a selection of a packet split at an aggregation point. That is, an aggregation point (e.g., a gateway or eNB) may determine to split packets of a data flow at a layer (e.g., an RLC layer or a PDCP layer) in a protocol stack, and the data flow is sent using the layers at or below the determined layer. In certain aspects, the determined layer comprises a packet data convergence protocol (PDCP) layer or radio link control (RLC) layer.

According to certain aspects of the present disclosure, reporting a status comprises sending a PDCP status report or sending an RLC status report. That is, a UE may report a status for a packet by sending a PDCP status report or an RLC status report that includes an indication for the packet. According to certain aspects of the present disclosure, the same status is sent on each connection of the plurality of connections. That is, a UE reports the same status (e.g., "successfully received") on each of the plurality of connections, even if the UE successfully received the packet on some connections, but did not successfully receive the packet on other connections.

According to certain aspects of the present disclosure, the UE may receive a configuration (e.g., an RRC configuration) configuring the data flow to be received on more than one connection. In an aspect, the configuration (e.g., an RRC configuration) may configure a bearer type indicating the data flow is being sent on more than one connection. That is, use of a particular type of bearer (e.g., a duplicate-delivery bearer) may indicate to the UE that any data flows conveyed by that type of bearer are being sent on more than one connection.

According to certain aspects of the present disclosure, determining a data flow is being received from a plurality of connections comprises receiving duplicate packets for the data flow on more than one connection. That is, a receiving device may determine that it has received duplicate packets for a data flow and determine that the data flow is being received from a plurality of connections.

According to certain aspects of the present disclosure, the UE may send an indication of at least one service requirement of the data flow to another entity (e.g., a core network entity). For example, a UE may inform a core network entity (e.g., an MME) that a data flow requires a particular QoS or indicate a service, and the core network entity determines the QoS for the indicated service. According to certain aspects of the present disclosure, the UE may send an indication requesting the data flow be sent on more than one connection based on at least one service requirement of the data flow. For example, a UE may determine that a data flow requires a very low latency, and request that the data flow be sent on multiple connections, based on determining the data flow requires a very low latency.

Figure 12:
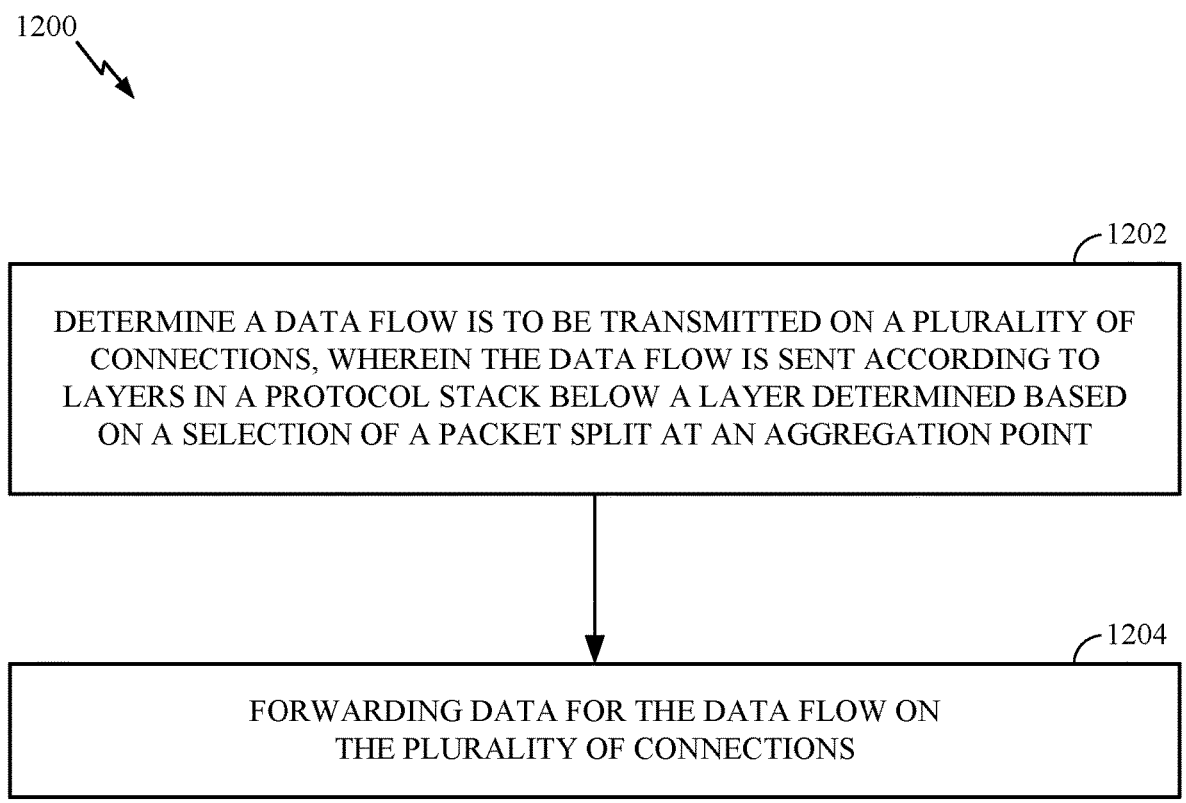
FIG. 12 sets forth example operations that may be performed by an eNodeB (eNB), according to aspects of the present disclosure.

FIG. 12 sets forth example operations 1200 for transmitting duplicate packets of a data flow on a plurality of connections (i.e., multi-connectivity), according to aspects of the present disclosure. The operations 1200 may be performed, for example, by a base station (BS), such as the MeNB and the SeNB shown in FIGS. 10A, 10B, 10C, and 10D.

The operations begin, at 1202, by the BS, for example, determining a data flow is to be transmitted on a plurality of connections, wherein the data flow is sent according to layers in a protocol stack below a layer determined based on a selection of a packet split at an aggregation point. That is, an aggregation point (e.g. a BS or gateway) for a data flow may determine to split packets of the data flow at a layer (e.g., an RLC layer or a PDCP layer) in a protocol stack, and then other devices serving the data flow (e.g., a BS) determine (e.g., based on control messages exchanged by network entities) the data flow is to be sent on a plurality of connections (e.g., using the layers at or below the determined layer). At 1204, the operations continue by the BS, for example, forwarding data (e.g., data packets) for the data flow on the plurality of connections.

According to certain aspects of the present disclosure, the determined layer comprises a packet data convergence protocol (PDCP) layer or a radio link control (RLC) layer. For example, a BS may determine to split a data flow at the PDCP layer and send duplicate PDCP packets for the data flow via multiple connections.

According to certain aspects of the present disclosure, the BS may receive a status report indicating data which has been received. For example, a BS may receive a status report indicating particular packets have been received by a UE. In an aspect, the status report may comprise a PDCP status report or an RLC status report. In another aspect, the status report indicates the data has been received on a first connection of the plurality of connections, and the BS ceases forwarding the data on other connections of the plurality of connections.

According to certain aspects of the present disclosure, the BS may transmit a request to configure the data flow to be sent on more than one connection. In an aspect, a request to configure the data flow to be sent on more than one connection may include configuring a UE to receive the data flow on more than one connection via, for example, RRC configuration. In an aspect, the configuration (e.g., an RRC configuration) may comprise configuring a bearer type indicating the data flow is being sent on more than one connection. That is, use of a particular type of bearer (e.g., a duplicate-delivery bearer) may indicate (e.g., to a UE) that any data flows conveyed by that type of bearer are being sent on more than one connection.

According to certain aspects of the present disclosure, the BS may receive a configuration for the data flow to be sent on more than one connection (e.g., from a core network entity). According to certain aspects of the present disclosure, the BS may determine a data flow is to be transmitted on a plurality of connections based on at least one service requirement of the data flow. For example, a BS may determine that a data flow requires a very low latency, and determine to send the data flow on multiple connections, based on determining the data flow requires a very low latency.

Figure 13:
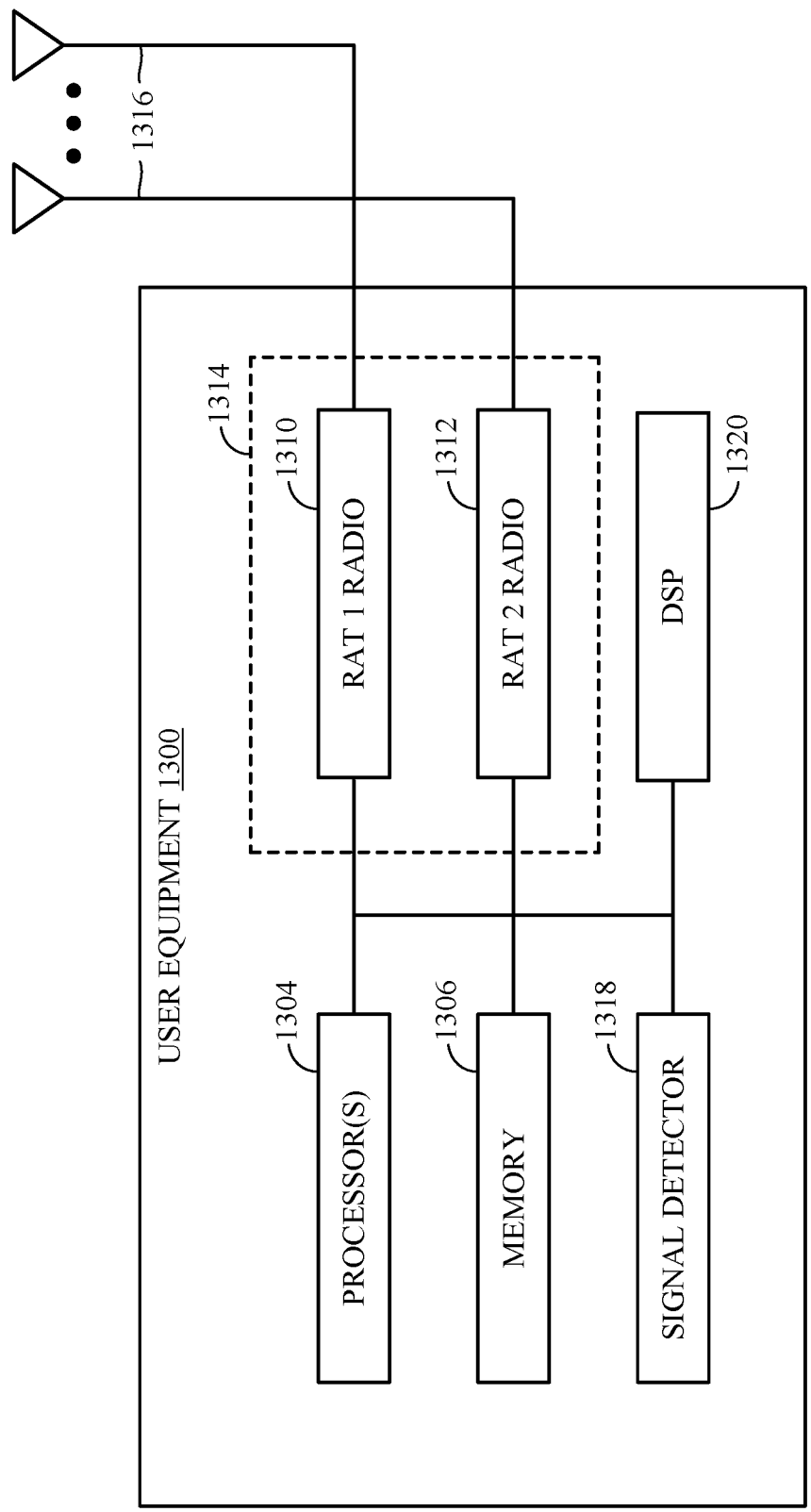
FIG. 13 illustrates a block diagram of an example user equipment, in accordance with aspects of the present disclosure.

FIG. 13 illustrates various components that may be utilized in a multi-connectivity enabled wireless device 1300 capable of operating in accordance with aspects provided herein. The wireless device 1300 may, for example, be one implementation of UE 110 shown in FIG. 1.

The wireless device 1300 may include one or more processors 1304 which control operation of the wireless device 1300. The processors 1304 may also be referred to as central processing units (CPUs). The processors 1304 may perform, or direct the UE in performing, multicasting and reporting status of data flows, as described above with reference to FIG. 11 and FIG. 12. Memory 1306, which may include both read-only memory (ROM) and random access memory (RAM), provides instructions and data to the processors 1304. A portion of the memory 1306 may also include non-volatile random access memory (NVRAM). The processors 1304 typically perform logical and arithmetic operations based on program instructions stored within the memory 1306. The instructions in the memory 1306 may be executable to implement the methods described herein, for example, reporting status of data flows and multicasting, as described above with reference to FIG. 11 and FIG. 12.

The wireless device 1300 may also include radios 1310 and 1312 to communicate via multiple RATs for multi-connectivity. Each radio may, for example, include a transmitter and receiver, and any other "RF chain" components to allow transmission and reception of data between the wireless device 1300 and different RATs. While two radios are shown for two RATs, as an example only, more than two radios may be included (e.g., to support more than two RATs). Each radio may communicate via a single or a plurality of antennas 1316.

The wireless device 1300 may also include a signal detector 1318 that may be used in an effort to detect and quantify the level of signals received by the transceiver 1314. The signal detector 1318 may detect such signals as total energy, energy per subcarrier per symbol, power spectral density and other signals. The wireless device 1300 may also include a digital signal processor (DSP) 1320 for use in processing signals.

Figure 14:
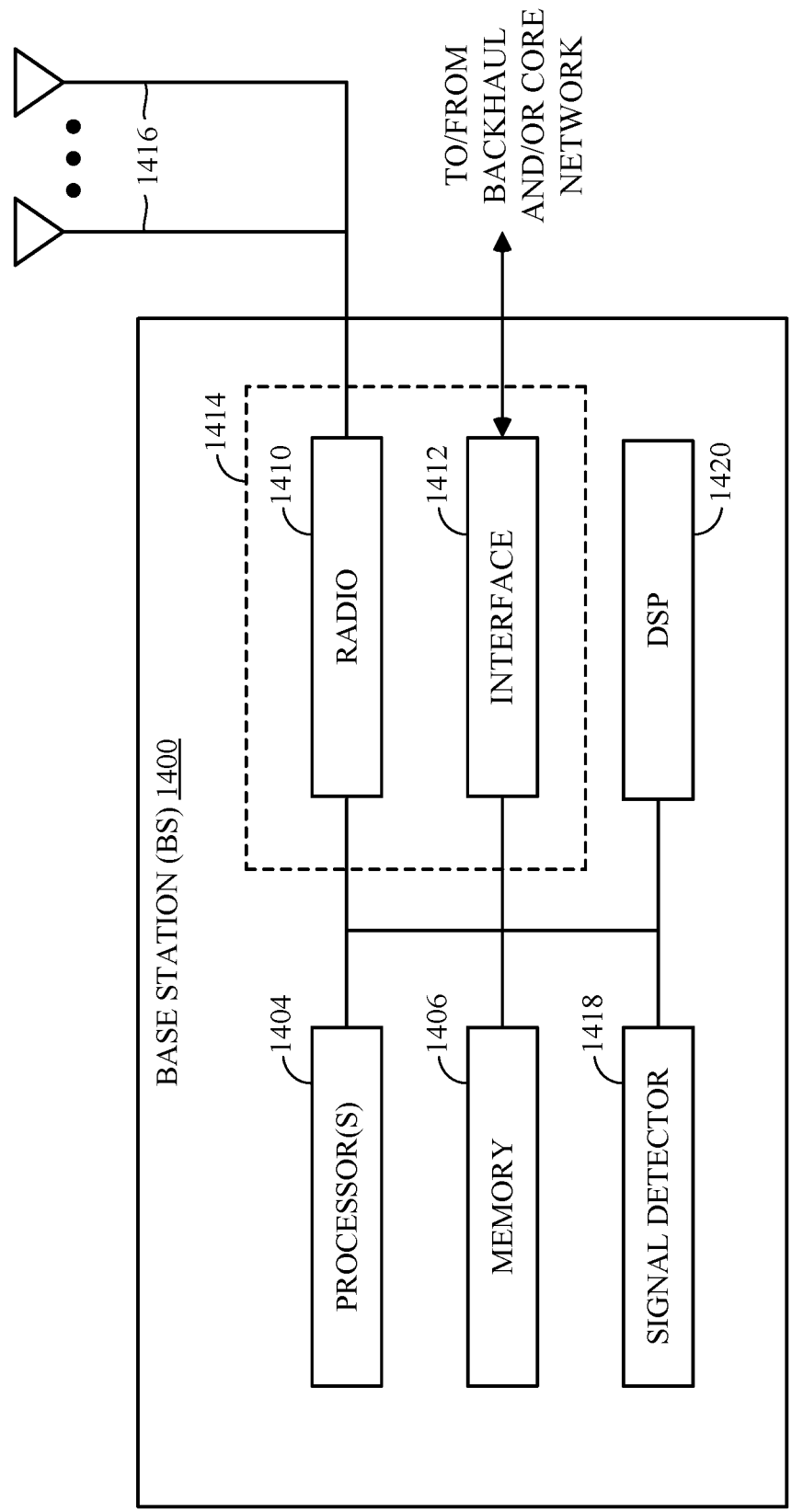
FIG. 14 illustrates a block diagram of an example base station, in accordance with aspects of the present disclosure.

FIG. 14 illustrates various components that may be utilized in a base station 1400 capable of participating in communication with a multi-connectivity enabled wireless device. The base station 1400 may, for example, be one implementation of MeNB 120 or SeNB 130 shown in FIG. 1.

The base station 1400 may include one or more processors 1404 which control operation of the base station 1400. The processors 1404 may also be referred to as central processing units (CPUs). The processors 1404 may perform, or direct the BS in performing, multicasting and reporting status of data flows, as described above with reference to FIG. 11 and FIG. 12. Memory 1406, which may include both read-only memory (ROM) and random access memory (RAM), provides instructions and data to the processors 1404. A portion of the memory 1406 may also include non-volatile random access memory (NVRAM). The processors 1404 typically perform logical and arithmetic operations based on program instructions stored within the memory 1406. The instructions in the memory 1406 may be executable to implement the methods described herein for example, for MeNBs and SeNBs serving a multi-connectivity UE, reporting status of data flows and multicasting, as described above with reference to FIG. 11 and FIG. 12.

The base station 1400 may also include one or more radios 1410, for example to communicate with a UE via one or more RATs. Each radio may, for example, include a transmitter and receiver, and any other "RF chain" components to allow transmission and reception of data between the base station 1400 and different UEs. Each radio may communicate via a single or a plurality of antennas 1416. The base station 1400 may also include an interface 1412 for communicating with other base stations (e.g., via an X2 backhaul connection) or a core network (e.g., via an S1 connection).

The base station 1400 may also include a signal detector 1418 that may be used in an effort to detect and quantify the level of signals received by the transceiver 1414. The signal detector 1418 may detect such signals as total energy, energy per subcarrier per symbol, power spectral density and other signals. The base station 1400 may also include a digital signal processor (DSP) 1420 for use in processing signals.

It is understood that the specific order or hierarchy of steps in the processes disclosed above is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method of reporting a status for a data flow operable at a user equipment (UE), comprising:
sending an indication requesting a data flow on more than one connection based on at least one service requirement of the data flow;
receiving a configuration indicating that the data flow, having duplicate packets, will be sent from a plurality of base stations on a plurality of connections via layers in a protocol stack having a packet split at a packet data convergence protocol (PDCP) layer or a radio link control (RLC) layer;
receiving a packet in the data flow from one of the plurality of base stations on at least one of the plurality of connections;
determining that the packet has a duplicate packet; and
sending a status report, to the plurality of base stations, indicating to the plurality of base stations to discard the packet, wherein the status report comprises a PDCP status report or an RLC status report.

2. The method of claim 1, wherein sending a status report comprises sending a same status report to each of the plurality of base stations on each of the plurality of connections.

3. The method of claim 1, wherein the received configuration comprises a bearer type indicating the data flow is going to be sent on more than one connection.

4. The method of claim 3, wherein the bearer type is a duplicate-delivery bearer.

5. A method of transmitting a data flow, comprising:
receiving an indication requesting a data flow on more than one connection based on at least one service requirement of the data flow;
transmitting a configuration, to a user equipment, indicating that the data flow, having duplicate packets, will be transmitted on a plurality of connections via layers in a protocol stack having a packet split at a packet data convergence protocol (PDCP) layer or a radio link control (RLC) layer;
transmitting a packet to the user equipment on at least one of the plurality of connections from a first base station of a plurality of base stations;
forwarding a duplicate of the packet, at the packet split of the protocol stack, to a second base station of the plurality of base stations; and
receiving a status report indicating to discard the packet, wherein the status report comprises a PDCP status report or a RLC status report.

6. The method of claim 5, further comprising forwarding the status report to the second base station.

7. The method of claim 6, wherein the status report indicates the packet has been received on a first connection of the plurality of connections, and the method further comprises ceasing forwarding the packet on other connections of the plurality of connections.

8. The method of claim 5, further comprising transmitting a request to configure the data flow to be sent on more than one connection.

9. The method of claim 5, further comprising receiving another configuration for the data flow to be sent on more than one connection, wherein transmitting the configuration is in response to receiving the other configuration.

10. The method of claim 5, wherein transmitting the configuration is based on at least one service requirement of the data flow.

11. An apparatus for reporting a status for a data flow, comprising:
means for sending an indication requesting a data flow on more than one connection based on at least one service requirement of the data flow;
means for receiving a configuration indicating that the data flow, having duplicate packets, will be sent from a plurality of base stations on a plurality of connections via layers in a protocol stack having a packet split at a packet data convergence protocol layer or a radio link control layer;
means for receiving a packet in the data flow from one of the plurality of base stations on at least one of the plurality of connections;
means for determining that the packet has a duplicate packet; and
means for sending a status report, to the plurality of base stations, indicating to the plurality of base stations to discard the packet, wherein the status report comprises a PDCP status report or a RLC status report.

12. The apparatus of claim 11, wherein the means for sending a status report comprises means for sending a same status report to each of the plurality of base stations on each of the plurality of connections.

13. The apparatus of claim 11, wherein the received configuration comprises a bearer type indicating the data flow is going to be sent on more than one connection.

14. The apparatus of claim 13, wherein the bearer type is a duplicate-delivery bearer.

15. An apparatus for transmitting a data flow, comprising:
means for receiving an indication requesting a data flow on more than one connection based on at least one service requirement of the data flow;
means for transmitting a configuration, to a user equipment, indicating that the data flow, having duplicate packets, will be transmitted on a plurality of connections via layers in a protocol stack having a packet split at a packet data convergence protocol (PDCP) layer or a radio link control (RLC) layer;
means for transmitting a packet to the user equipment on at least one of the plurality of connections from a first base station of a plurality of base stations;
means for forwarding a duplicate of the packet, at the packet split of the protocol stack, to a second base station of the plurality of base stations; and
means for receiving a status report indicating to discard the packet, wherein the status report comprises a PDCP status report or a RLC status report.

16. The apparatus of claim 15, further comprising means for forwarding the status report to the second base station.

17. The apparatus of claim 16, wherein the status report indicates the packet has been received on a first connection of the plurality of connections, and the apparatus further comprises means for ceasing forwarding the packet on other connections of the plurality of connections.

18. The apparatus of claim 15, further comprising means for transmitting a request to configure the data flow to be sent on more than one connection.

19. The apparatus of claim 15, further comprising means for receiving another configuration for the data flow to be sent on more than one connection.

20. The apparatus of claim 15, wherein the means for transmitting is based on at least one service requirement of the data flow.

21. A method of wireless communication operable at a user equipment (UE), comprising:
sending an indication requesting a data flow from a plurality of cells based on at least one service requirement of the data flow;
receiving a configuration indicating that the data flow, having duplicate packets, will be sent from a plurality of cells via layers in a protocol stack having a packet split at a packet data convergence protocol (PDCP) layer or a radio link control (RLC) layer;
receiving a packet in the data flow from one of the plurality of cells;
determining that the packet has a duplicate packet; and
sending a status report, to the plurality of cells, indicating to the plurality of cells to discard the packet, wherein the status report comprises a PDCP status report or a RLC status report.

22. The method of claim 21, wherein sending a status report comprises sending a same status report to each of the plurality of cells.

23. The method of claim 21, wherein the received configuration comprises a bearer type indicating the data flow is going to be sent on more than one connection.

24. The method of claim 23, wherein the bearer type is a duplicate-delivery bearer.

25. A method of wireless communication operable at a user equipment (UE), comprising:
sending an indication requesting a data flow on more than one connection based on at least one service requirement of the data flow;
receiving a configuration indicating that the data flow, having duplicate packets, will be transmitted to a plurality of cells via layers in a protocol stack having a packet split at a packet data convergence protocol (PDCP) layer or a radio link control (RLC) layer;
transmitting the duplicate packets to at least one of the plurality of cells;
receiving a status report indicating to discard at least one of the duplicate packets, wherein the status report comprises a PDCP status report or a RLC status report; and
ceasing transmission of the at least one of the duplicate packets based on the status report.

26. The method of claim 25, further comprising receiving a configuration comprising a bearer type indicating that the data flow is to be transmitted to the plurality of cells.

27. The method of claim 26, wherein the bearer type is a duplicate-delivery bearer.

28. The method of claim 25, wherein receiving the status report comprises receiving a same status report from each of the plurality of cells.

* * * * *